US006824713B2

(12) United States Patent
Kuzuoka et al.

(10) Patent No.: US 6,824,713 B2
(45) Date of Patent: Nov. 30, 2004

(54) METHOD OF PRODUCING THERMISTOR ELEMENT AND PRODUCTION APPARATUS FOR PRODUCTION APPARATUS FOR PRODUCING RAW MATERIALS FOR THERMISTOR ELEMENT

(75) Inventors: Kaoru Kuzuoka, Toyota (JP); Itsuhei Ogata, Okazaki (JP); Daisuke Makino, Ichinomiya (JP); Muneo Yorinaga, Anjyo (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 10/227,805

(22) Filed: Aug. 27, 2002

(65) Prior Publication Data

US 2003/0038704 A1 Feb. 27, 2003

(30) Foreign Application Priority Data

Aug. 27, 2001 (JP) ....................................... 2001-256150
Oct. 9, 2001 (JP) ....................................... 2001-311723

(51) Int. Cl.[7] ............................ B29B 9/00; C04B 33/32
(52) U.S. Cl. ......................... 264/13; 264/40.1; 264/616
(58) Field of Search ............................. 264/616, 6, 13, 264/40.1

(56) References Cited

U.S. PATENT DOCUMENTS

| | | | | | |
|---|---|---|---|---|---|
| 4,800,051 | A | * | 1/1989 | Yan | 264/660 |
| 5,229,046 | A | * | 7/1993 | Watanabe et al. | 264/44 |
| 5,627,116 | A | * | 5/1997 | Zuk | 264/1.21 |
| 6,261,480 | B1 | | 7/2001 | Ogata et al. | |
| 6,306,315 | B1 | | 10/2001 | Ogata et al. | |
| 2003/0056584 | A1 | * | 3/2003 | Park | 73/204.11 |
| 2003/0139624 | A1 | * | 7/2003 | Baker et al. | 560/243 |

FOREIGN PATENT DOCUMENTS

| | | | |
|---|---|---|---|
| EP | 0 623 569 | A1 | 11/1994 |
| EP | 0 866 472 | A2 | 9/1998 |
| EP | 1 137 016 | A1 | 9/2001 |
| FR | 2 775 537 | | 9/1999 |
| JP | A-7-201528 | | 8/1995 |

* cited by examiner

*Primary Examiner*—Christopher A. Fiorilla
(74) *Attorney, Agent, or Firm*—Nixon & Vanderhye P.C.

(57) ABSTRACT

Thermistor elements composed mainly of a metal oxide sintered body are prepared by mixing a metal oxide precursor in a liquid phase to prepare a solution or slurry of the precursor. The precursor solution or slurry is sprayed to form droplet particles which are heat treated to form a thermistor raw material powder which powder is then molded and sintered into a shape to provide a metal oxide sintered body.

34 Claims, 10 Drawing Sheets

METHOD OF PRODUCING THERMISTOR ELEMENT AND PRODUCTION APPARATUS FOR PRODUCTION APPARATUS FOR PRODUCING RAW MATERIALS FOR THERMISTOR ELEMENT

BACKGROUND OF THE INVENTION

1. Field of the Invention

This invention relates to a method of producing a thermistor element, formed mainly of a metal oxide sintered body, and a production apparatus for producing raw materials for such a thermistor element. The thermistor element can be appropriately used for a thermistor element of a temperature sensor, for an automobile exhaust gas, etc, capable of detecting a temperature from room temperature to a high temperature in the range of 1,000° C. or above.

2. Description of the Related Art

Thermistor elements of this kind, and formed mainly of a metal oxide sintered body, have been used in the past for temperature sensors for measuring temperatures from a medium temperature range to a high temperature range of 400 to 1,300° C. such as an automobile exhaust gas temperature, a gas flame temperature of gas fed water heaters, a temperature of a heating furnace, and so forth.

Metal oxide sintered bodies made of a perovskite type material, a corundum type material, etc, have been mainly used for the thermistor elements of this kind. A thermistor element using the perovskite type material, for example, is described in Japanese Unexamined Patent Publication (Kokai) No. 7-201528.

To produce a thermistor element that can be used in a broad temperature range, the thermistor element in this reference is obtained by a so-called "solid phase method" that mixes, pulverizes, granulates and sinters a plurality of oxide materials, e.g. Y, Sr, Cr, Fe and Ti, in a predetermined composition ratio.

In the preparation of the raw materials of the thermistor element in the solid phase method described above, mixing and pulverization of a plurality of oxide raw materials are carried out by use of a medium stirring mill, for example. However, mechanical pulverization using the medium stirring mill is essentially not free from the limit of the pulverization capacity, and the mean particle size of the thermistor raw materials after mixing and pulverization is 0.3 $\mu$m, as a limit.

Since the particle size of the pulverized starting materials has a limit when pulverization and mixing of the raw materials are simultaneously carried out, uniformity of the composition is not sufficient to obtain a thermistor element having a higher level of accuracy. Therefore, the resulting thermistor element has large variance of resistance, and this variance invites deterioration of temperature accuracy of the temperature sensors using this thermistor element. Temperature accuracy of temperature sensors using the thermistor element according to the prior art is at most ±15° C. (from room temperature to 800° C.).

In the mixing-pulverization operation by use of the medium stirring mill, components of zirconia balls as a pulverization medium mix as impurities into the thermistor raw materials and result in variance of the resistance or invites deviation of a composition from a target composition.

In the temperature sensors of the automobile exhaust gas, there is a great need for a system for detecting exhaust gas temperatures before and after a catalyst for purifying the exhaust gas of gasoline-engine cars to detect deterioration of the catalyst, and for a system for detecting the exhaust temperatures before and after the catalyst to control the temperature of the catalyst for controlling the exhaust gas, particularly a NOx gas, of diesel engines.

However, the temperature accuracy of the temperature sensors using the thermistor element according to the prior art cannot establish this system, and expensive thermocouples or platinum resistors have been used for the temperature sensors. In other words, no temperature sensors are available, to this date, that have temperature accuracy adaptable to the system described above.

In view of the problems described above, the present invention contemplates to reduce variance of the resistance value of the thermistor element when producing the thermistor element formed mainly of the metal oxide sintered boy, and to make further uniform the composition of the thermistor raw materials to obtain a higher level of temperature accuracy.

SUMMARY OF THE INVENTION (I) To begin with, a solution means for obtaining excellent temperature accuracy by forming micro-particles of a thermistor raw material and making uniform the composition will be explained.

To accomplish the object, a first aspect of the invention provides a method of producing a thermistor element consisting of a metal oxide sintered body as a principal component thereof, comprising the steps of mixing a precursor of a metal oxide in a liquid phase and preparing a precursor solution; spraying the precursor solution and obtaining droplet particles; heat-treating the droplet particles and obtaining thermistor raw material powder; and molding and sintering the thermistor raw material powder into a predetermined shape, and obtaining the metal oxide sintered body.

According to this method, mixing of the raw materials can be conducted under the state of the precursor solution. In other words, the composition for obtaining the final metal oxide sintered body can be uniformly regulated in the liquid phase state in which the particles are finer than in the solid phase method according to the prior art. Consequently, the composition of the resulting thermistor raw material powder can be made move uniform. This method is free from mixing of a pulverization medium as an impurity that has been observed in the solid phase method.

The metal oxide sintered body obtained by molding and sintering this raw material powder, that is, the thermistor element, has reduced variance of the resistance value and can provide a higher temperature accuracy than the prior art.

Here, the precursor solution preferably contains at least one kind of metal ion complex.

Water or an organic solvent, or a mixed solution of water and the organic solvent, can be used as the solvent of the precursor solution.

According to a second aspect of the invention, there is provided a method of producing a thermistor element consisting of a metal oxide sintered body as a principal component thereof, comprising the steps of preparing a slurry solution dispersing particles of a metal or a metal oxide; spraying the slurry solution and obtaining droplet particles; heat-treating the droplet particles and obtaining thermistor raw material powder; and molding and sintering the thermistor raw material powder into a predetermined shape, and obtaining the metal oxide sintered body.

According to this method, mixing of the raw materials can be conducted in the form of the slurry solution. In other words, the composition for obtaining the final metal oxide sintered body can be regulated to a uniform composition under the liquid phase state where the particles are finer than in the solid phase method according to the prior art, in the same way as in the first aspect of the invention. Therefore, the composition of the resulting thermistor raw material powder can be made move uniform. This method is free from mixing of the pulverization medium as the impurity as has been the case with the solid phase method.

The metal oxide sintered body formed and sintered by use of this raw material powder, that is, the thermistor element, exhibits reduced variance of the resistance value, and can provide a higher temperature accuracy than the prior art.

To uniformly mix the raw materials, the particle size of the particles of the metal or metal oxide in the slurry solution is preferably 100 nm or below.

The solvent of the slurry solution is preferably water or an organic solvent, or a mixed solution of water and the organic solvent.

The precursor solution or the slurry solution preferably uses a solution to which an inflammable solvent is added and mixed.

In this case, because the inflammable solvent is added and mixed, thermal decomposition and combustion of the droplet particles proceeds rapidly during heat-treatment of the droplet particles sprayed, and the thermistor raw material powder can be obtained with a more uniform composition.

The inflammable solvent is preferably the one selected from the group of methanol, ethanol, isopropyl alcohol, ethylene glycol and acetone.

In the invention, the heat-treating step of the droplet particles uses heating means (5) capable of controlling the temperature in such a fashion that the temperature progressively increases from an inlet of the droplet particles towards an outlet. As a result, the invention can obtain thermistor raw material powder having a sphericalness X, defined by a maximum particle size R max and a minimum particle size R min and expressed by the following equation (1), of at least 80%:

$$X=(R\text{min}/R\text{max})\times 100\% \quad (1)$$

The heat-treating step of the droplet particles uses a heating means capable of controlling the temperature in such a fashion that it progressively increases from the inlet of the droplet particles towards the outlet. Therefore, the heat-treating temperature of the droplet particles can be gradually increased.

If the heat-treating temperature of the droplet particles is drastically increased, the droplets rupture and the resulting thermistor raw material powder is likely to become amorphous. When the amorphous thermistor raw material powder is sintered, pores (air entrapment portions inside the sintered body) are likely to develop inside the sintered body.

When the heat-treating temperature of the droplet particles is gradually increased, the raw material powder may become perfect spheres and, when molding and sintering are conducted using the thermistor raw material powder having sphericalness X of at least 80%, the packing property can be improved with the result that pores do not occur. As a thermistor element having a high density and uniform sintered particles can thus be obtained, variance of the resistance value can be further reduced and a high-performance thermistor element can be provided.

The particle size of the droplet particles is preferably not greater than 100 μm. When the particle size of the droplet particles is 100 μm or below, the composition can be made more uniform.

The metal oxide sintered body is a mixed sintered body $(M1M2)O_3\cdot AOx$ of a compound oxide expressed by $(M1M2)O_3$ and a metal oxide expressed by AOx, M1 in the compound oxide $(M1M2)O_3$ is at least one kind of elements selected from the Group 2A and the Group 3A of the Periodic Table with the exception of La, M2 is at least one kind of elements selected from the Groups 3B, 4A, 5A, 6A, 7A and 8 of the Periodic Table, and the metal oxide AOx is a metal oxide having a melting point of 1,400° C. or above and a resistance value at least 1,000 Ω at 1,000° C. as a single substance of AOx in the form of the thermistor element.

To produce a temperature sensor to be used over a broad temperature range, it is preferred to use a mixed sintered body of a compound oxide $(M1M2)O_3$ of a perovskite structure having relatively low resistance characteristics in a temperature range of room temperature to 1,000° C. and a metal oxide AOx having a high resistance value and a high melting point.

When the metal oxide AOx having a melting point of 1,400° C. or above and a resistance value of at least 1,000 Ω at 1,000° C., as the AOx single substance in the form of the thermistor element, is used, the resistance value of the mixed sintered body in the high temperature range, its melting point and heat-resistance can be increased. Therefore, high temperature stability of the thermistor element can be improved.

In this way, it is possible to obtain a thermistor element the resistance value of which falls within the range of 100 Ω to 100 KΩ in the temperature range of room temperature to 1,000° C., which exhibits a small resistance value change due to thermal history, which is excellent in stability and which can be used in a broad temperature range.

Here, a molar fraction a of the compound oxide $(M1M2)O_3$ and a molar fraction b of the metal oxide AOx in the mixed sintered body $(M1M2)O_3.AOx$ preferably satisfy the relation $0.05\leqq a<1.0$, $0<b\leqq 0.95$ and $a+b=1$.

When these molar fractions a and b have the relation described above, the effect of the thermistor described above (resistance value within predetermined range and resistance stability) can be obtained more reliably. Since the molar fractions can be changed in such a broad range, the resistance value and the resistance temperature coefficient can be variously controlled within a broad range when $(M1M2)O_3$ and AOx are appropriately mixed and sintered.

As to the metal elements in the compound oxide $(M1M2)O_3$, it is preferred, practically, that M1 is at least one kind of elements selected from the group consisting of Mg, Ca, Sr, Ba, Y, Ce, Pr, Nd, Sm, Eu, Gd, Tb, Dy, Ho, Er, Yb and Sc, and M2 is at least one kind of elements selected from the group consisting of Al, Ga, Ti, Zr, Hf, V, Nb, Ta, Cr, Mo, W, Mn, Tc, Re, Fe, Co, Ni, Ru, Rh, Pd, Os, Ir and Pt.

In the metal oxide AOx, the metal element A is preferably at least one kind of elements selected from the group consisting of B, Mg, Al, Si, Ca, Sc, Ti, Cr, Mn, Fe, Ni, Zn, Ga, Ge, Sr, Y, Zr, Nb, Sn, Ce, Pr, Nd, Sm, Eu, Gd, Tb, Dy, Ho, Er, Tm, Yb, Lu, Hf and Ta.

The metal oxide AOx is at least one kind of metal oxides selected from the group consisting of $B_2O_3$, $MgO$, $Al_2O_3$, $SiO_2$, $Sc_2O_3$, $TiO_2$, $Cr_2O_3$, $MnO$, $Mn_2O_3$, $Fe_2O_3$, $Fe_3O_4$, $NiO$, $ZnO$, $Ga_2O_3$, $Y_2O_3$, $ZrO_2$, $Nb_2O_5$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_3$, $2MgO\cdot SiO_2$, $MgSiO_3$, $MgCr_2O_4$, $MgAl_2O_4$, $CaSiO_3$, $YAlO_3$, $Y_3Al_3O_{12}$, $Y_2SiO_3$ and $3Al_2O{\cdot}2SiO_2$.

All of these metal oxides have a high resistance value and a high heat resistance and contribute to the improvement of performance of the thermistor element.

In the compound oxide $(M1M2)O_3$, M1 can be Y, M2 can be Cr and Mn, and the metal oxide AOx can be $Y_2O_3$.

At this time, the mixed sintered body is $Y(CrMn)O_3{\cdot}Y_2O_3$. This mixed sintered body is appropriately used for the temperature sensors and can exhibit high performance in a broad temperature range.

The mixed sintered body $(M1M2)O_3{\cdot}AOx$ contains at least one of CaO, $CaCO_3$, $SiO_2$ and $CaSiO_3$ as a sintering aid. Consequently, a thermistor element having a high sintering density can be obtained.

A third aspect of the invention provides an apparatus for producing a raw material of a thermistor element consisting of a metal oxide sintered body as a principal component thereof, comprising spraying means (4) for spraying a precursor solution prepared by mixing a precursor of the metal oxide in a liquid phase and obtaining droplet particles; heating means (5) for heat-treating the droplet particles and obtaining thermistor raw material powder; and recovering means (6) for recovering the thermistor raw material powder; wherein the spraying means, the heating means and the recovering means are interconnected to one another in the indicated order.

Having the construction described above, the production apparatus of the invention can continuously conduct a series of operations such as spraying the precursor solution from the spraying means to form droplet particles, heat-treating the droplet particles by the heating means and recovering the thermistor raw material powder by the recovering means. Therefore, this production apparatus makes it possible to appropriately accomplish the production method of the first aspect of the invention by using the precursor solution, to select the operation time and the scale of the apparatus in accordance with the production quantity and to continuously obtain the raw material powder.

According to a fourth aspect of the invention, there is provided an apparatus for producing a raw material of a thermistor element consisting of a metal oxide sintered body as a principal component thereof, comprising: spraying means (4) for spraying a slurry solution dispersing therein particles of a metal or a metal oxide and obtaining droplet particles; heating means (5) for heat-treating the droplet particles and obtaining thermistor raw material powder; and recovering means (6) for recovering the thermistor raw material powder; wherein the spraying means, the heating means and the recovering means are interconnected to one another in order named.

Owing to the construction described above, the production apparatus of the invention makes it possible to appropriately accomplish the production step of the fourth aspect of the invention by using the slurry solution, to select the operation time and the scale of the apparatus in accordance with the production quantity and to continuously obtain the raw material powder.

A suitable embodiment of the invention includes droplet diameter detecting means (7) for detecting diameters of the droplet particles obtained from the spraying means (4), and wherein the spraying means, the droplet diameter detecting means, the heating means (5) and the recovering means (6) are interconnected to one another in order named.

When the spraying means is regulated on the basis of information of the diameters of the droplet particles obtained from the droplet diameter detecting means, it becomes possible to stabilize the process, to reduce fluctuation among the raw material lots, for example, and to make a contribution to the quality management of the product.

Further, the production apparatus may include arithmetic operation/controlling means (8) for conducting an arithmetic operation and an analysis on the basis of droplet particle data of the droplet diameter measuring means (7), and controlling a spraying condition of the spraying means (4). Therefore, the production apparatus can more reliably execute automatic control, can further stabilize the process and can contribute to quality management of the product.

The spraying means (4) for obtaining the droplet particles is appropriately a two-fluid nozzle, an injection nozzle or a ultrasonic atomizer.

When the atomizing means (4) is the two-fluid nozzle, a gas selected from air, nitrogen and oxygen can be used as a carrier gas for the two-fluid nozzle.

The spraying means (4) is preferably the one that can introduce the flow of the droplet particles under a rotating state into the heating means (5). As the droplet particles move while rotating inside the heating means, the traveling distance of the droplet particles inside the heating means can be advantageously elongated.

An internal pressure of the tank constituted by means from the spraying means (4) to the recovering means (6) interconnected to one another can be kept at a negative pressure. As the internal pressure of the tank is kept at the negative pressure, a smooth flow of the droplet particles can be created. Consequently, a thermistor raw material powder (synthetic raw material) having a more stabilized composition can be obtained.

When the internal pressure of the tank is not the negative pressure, gas introducing means for introducing the gas into an atomization chamber (42) of the spraying means along the flow of the droplet particles generated by the spraying means (4) is preferably provided.

The flow of the gas introduced from the gas introducing means into the atomization chamber can make smooth the flow of the droplet particles sprayed. Therefore, a thermistor raw material powder (synthetic raw material) having a more stabilized composition can be obtained.

The heating means (5) appropriately comprises a quartz hollow tube (52) having an inlet of the droplet particles and an outlet from which the heat-treated thermistor raw material powder comes out, and an electric furnace (51). The electric furnace can constitute at least one temperature zone that is controlled to a predetermined temperature between the inlet and the outlet of the quartz hollow tube.

When the construction of the temperature zone and its temperature are controlled, the temperature can be set in accordance with thermal behavior of the composition of the starting raw materials. Therefore, thermistor raw material powder having a more uniform composition can be synthesized.

The recovering means (6) may include a cyclone, a filter or an electric precipitator. These recovering means are means suitable for recovering the thermistor raw material powder as the powdery raw material.

The recovering means (6) may include a cyclone on the upstream side and the filter or the electric precipitator on the downstream side.

When the cyclone suitable for recovering large amounts of raw material powder having relatively large particles is disposed on the upstream side and the filter or the electric precipitator suitable for recovering small amount of raw material powder having relatively small particle sizes is disposed on the downstream side, it is possible to constitute means suitable for recovering powdery raw material having smaller particle sizes.

The recovering means (6) is preferably operated while its temperature is controlled to 100 to 200° C.

From the aspects of the heat-resistance of the filter material and efficiency of the electric precipitator used for the recovering means, the temperature inside the recovering means is preferably 200° C. or below, and is preferably at least 100° C. so as not to wet the thermistor raw material powder as the steam occurring in the heating means dews in the recovering means.

The invention provides a temperature sensor equipped with the thermistor element that is produced by any of the production methods described above.

The thermistor element produced by the production method described above has reduced variance of the resistance value and has higher temperature accuracy than the prior art level. The temperature sensor sensor using such a thermistor element can detect the temperature over a broad temperature range and can accomplish stable resistance value characteristics and a high-performance temperature sensor because variance of the resistance is small.

Incidentally, a number in parentheses for each means represents an example of correspondence relation to concrete means described in the later-appearing embodiments.

(II) Further, solution means capable of improving temperature accuracy by eliminating the pores of a molding obtained by molding the ceramic raw material powder will be explained.

In other words, the present inventors have conducted intensive studies of the production method of the ceramic element by the solid phase method of the prior art to solve the problems described above, and have discovered that resistance variance can be reduced and temperature accuracy can be improved when pores of a molding (air entrapment portions in a molding) are eliminated.

The solid phase method includes the steps of pulverizing and mixing metal oxide raw materials by use of a medium stirring mill to obtain ceramic raw material powder, mixing a binder for granulating the ceramic raw material with the raw material, granulating the mixture, molding the resulting granulated powder, and sintering the resulting molding.

In the production method by the solid phase method of the prior art, however, mixing and pulverization of the raw materials are simultaneously conducted as described above. In addition, since there is the limit to the particle size of the raw materials so pulverized, the composition of the ceramic element does not become sufficiently uniform. When the components of the pulverization medium mix as impurities into the ceramic low materials, the composition deviates from a target composition of the ceramic element.

Then, the pores occur in the molding obtained by molding, or such pores result in pores in the ceramic element (air entrapment portions in the sintered body constituting the ceramic element) obtained by sintering a molding having a low molding specific gravity due to the existence of the pores.

For this reason, the ceramic element produced by the solid phase method according to the prior art has a low relative specific gravity that is derived from the sintering specific gravity as the actual measurement value and a theoretical specific gravity as a theoretical specific gravity, and the relative specific gravity is generally from 80% to 85%. As a result, the resistance variance closely associated with the internal structure of the ceramic element increases.

Therefore, the present inventors produced the ceramic raw material powder by a liquid phase method. Speaking more concretely, metal oxides or their precursors are dissolved or dispersed and mixed, and droplet particles obtained from the solution are heat-treated to obtain a ceramic raw material powder.

According to this method, mixing of the raw materials can be conducted in the solution form. In other words, the composition for obtaining the final metal oxide sintered body can be uniformly regulated in the liquid phase state where the particles are smaller than in the solid phase method according to the prior art, and the composition of the resulting ceramic raw material powder can be made more uniform. This method is free from mixing of the pulverization medium as the impurity that has been observed in the solid phase method.

However, the following problem occurs when the ceramic raw material powder is prepared by the liquid phase method. The ceramic raw material powder prepared by the liquid phase method directed to attain uniformity of the composition consists of fine particles having a mean particle size of 30 to 50 nm (nano-meters).

Granulated powder suitable for molding by use of a metal mold is prepared by adding a binder, etc, to this ceramic raw powder of the fine particles. Because the particles are fine particles, however, it is difficult to uniformly spread the binder, etc, to be added for granulation, among the particles of the ceramic raw material powder.

As a result, the portions where the binder does not uniformly enter the gaps among the particles form granulated powder in which the ceramic raw material powder is not tightly bonded and pores eventually develop in the molding obtained by metal molding.

In other words, the liquid phase method can solve the problem, of the solid phase method, that the composition of the ceramic raw material powder is not uniform. However, when the liquid phase method is used, a new problem develops in that permeability of the binder mixed with the raw material powder is not sufficient and eventually, the pores occur in the molding or the sintered body (ceramic element) after sintering.

As a result of the analysis of the cases, the present inventors have found that when the mean particle size of the ceramic raw material powder is controlled, the occurrence of the pores in the molding can be eliminated and the relative specific gravity of the ceramic element obtained after sintering can be raised to 90% or more. In this way, the problem described above can be eliminated. The invention is completed on the basis of the observation acquired from the investigation result given above.

A fifth aspect of the invention provides a method of producing a ceramic element formed of a sintered body obtained by sintering a ceramic raw material made of a metal oxide, wherein raw material powder produced by a liquid phase method and having a mean particle size of 0.1 to 1.0 μm is used as the ceramic raw material, and the ceramic raw material is granulated, molded and sintered so that the sintered by has a relative specific gravity X, defined by a sintering specific gravity and a theoretical specific gravity, of at least 90% as expressed by the following equation (2):

$$\text{relative specific gravity } X = (\text{sintering specific gravity}/\text{theoretical specific gravity}) \times 100\% \quad (2)$$

By using the liquid phase method, the invention can make the composition of the ceramic raw material further uniform.

Studies conducted by the present inventors have experimentally revealed that when the mean particle size of the ceramic raw material powder produced by the liquid phase method is within the range of 0.1 to 1.0 μm, the binder uniformly permeates among the particles of the raw material powder when the granulated powder is formed by mixing the binder with the raw material powder.

Therefore, the ceramic raw material powder is bonded mutually and tightly to form the granulated powder. In the molding obtained by molding such granulated powder, the occurrence of the pores can be suppressed, and a ceramic element formed of the sintered body having a relative specific gravity X of at least 90% can be obtained.

As described above, the invention can make the composition of the ceramic raw materials more uniform than in the prior art method, and can reduce variance of the resistance value of the ceramic element by reducing the pores and improving the relative specific gravity X.

A sixth aspect of the invention provides a method of producing a ceramic element formed of a sintered body obtained by sintering a ceramic raw material made of a metal oxide, comprising the steps of mixing a precursor of the metal oxide in a liquid phase and preparing a precursor solution; spraying the precursor solution and obtaining droplet particles; conducting a first heat-treatment step of heat-treating the droplet particles and obtaining raw material powder of the ceramic element; conducting a second heat-treatment step of heat-treating the raw material powder obtained by the first heat-treatment step at a temperature higher than that of the first heat-treatment step, and changing a mean particle size of the raw material powder to 0.1 to 1.0 μm; and granulating, molding and sintering the raw material obtained by the second heat-treatment step.

According to this method, mixing of the raw materials can be made in the state of the precursor solution, that is, by the liquid phase method, before the first heat-treatment step. Therefore, the composition of the ceramic raw material can be made move uniform.

The second heat-treatment step allows the fine particles of the raw material powder obtained by the liquid phase method to grow to a mean particle size of 0.1 to 1.0 μm. Therefore, when the mixture of this raw material powder and the binder are used to form the granulated powder in the same way as in the fifth aspect of the invention, the binder uniformly permeates the particles, and the ceramic raw material powder is converted to a granulated powder in which the particles are tightly bonded to one another. As a result, the occurrence of the pores in the molding can be suppressed.

Therefore, the invention can make the composition of the ceramic raw materials much more uniform than can the prior art method. Because the invention reduces the pores and improves the relative specific gravity $X(X \geqq 90\%)$, it can reduce variance of the resistance value of the ceramic element.

A seventh aspect of the invention provides a method of producing a ceramic element formed of a sintered body obtained by sintering a ceramic raw material made of a metal oxide, comprising the steps of preparing a slurry solution dispersing therein particles of a metal or a metal oxide having a mean particle size of 1.0 μm or below; spraying the slurry solution and obtaining droplet particles; conducting a first-heat-treatment step of heat-treating the droplet particles and obtaining raw material powder of the ceramic element; conducting a second heat-treatment step of heat-treating the raw material powder obtained by the first heat-treatment step at a temperature higher than that of the first heat-treatment step, and changing a mean particle size of the raw material powder to 0.1 to 1.0 μm; and granulating, molding and sintering the raw material obtained by the second heat-treatment step.

In the first heat-treatment step, the mixture of the raw materials can be regulated to a uniform composition for obtaining the final sintered body under the liquid state where the particles are much smaller than in the solid phase method of the prior art, in the same way as in the sixth aspect of the invention. Therefore, the resulting composition of the ceramic raw material powder can be made move uniform.

The second heat-treatment step allows the particles of the fine raw material powder obtained by the liquid phase method to grow move and the mean particle size can be changed to 0.1 to 1.0 μm. Consequently, the binder uniformly permeates the particles in the same way as in the fifth aspect of the invention, and the granulated powder in which the raw material powder is bonded mutually tightly can be prepared. Eventually, the occurrence of the pores can be suppressed in the molding.

Therefore, this invention can make the ceramic raw material composition much more uniform than the prior art method, can reduce the pores and can improve the relative specific gravity $X(X \geqq 90\%)$. As a result, the invention can reduce variance of the resistance value of the ceramic element.

An eighth aspect of the invention provides a method of producing a ceramic element formed of a sintered body obtained by sintering a ceramic raw material made of a metal oxide, comprising the steps of mixing a precursor of the metal oxide in a liquid phase and preparing a precursor solution; preparing a dispersion solution by dispersing particles of a metal or a metal oxide having a mean particle size of not greater than 1.0 μm in the precursor solution; spraying the dispersion solution and obtaining droplet particles; conducting a first heat-treatment step of heat-treating the droplet particles and obtaining raw material powder of the ceramic element; conducting a second heat-treatment step of heat-treating the raw material powder obtained by the first heat-treatment step at a temperature higher than that of the first heat-treatment step, and changing a mean particle size of the raw material powder to 0.1 to 1.0 μm; and granulating, molding and sintering the raw material obtained by the second heat-treatment step.

According to this method, the mixing of the raw materials can be uniformly regulated to the composition for obtaining the final sintered body under the liquid phase state, in which the particles are smaller than in the solid phase method of the prior art, before the first heat-treatment step in the same way as in the sixth aspect of the invention. Therefore, the composition of the resulting ceramic raw material powder can be made move uniform.

The second heat-treatment step allows the particles of the fine raw material powder obtained by the liquid phase method to grow move, and the mean particle can be changed to 0.1 to 1.0 μm. Therefore, the binder uniformly permeates among the particles in the same way as in the fifth aspect of the invention, and the granulated powder in which the raw material powder is bonded mutually tightly can be prepared. Eventually, the occurrence of pores can be suppressed in the molding.

Therefore, this invention can make the ceramic raw material composition much more uniform than the prior art method, can reduce the pores and can improve the relative specific gravity $X(X \geqq 90\%)$. As a result, the invention can reduce variance of the resistance value of the ceramic element.

In the production method described in any of the fifth to eighth aspects of the invention, the moisture ratio of the granulated powder obtained after granulation of the raw material power can be appropriately set to 3% or below.

The mixture of the raw material powder and the binder is granulated, and the resulting granulated powder is molded by use of a metal mold. In this case, the granulated powder must smoothly flow into the mold. To conduct molding without forming a bridging inside the mold, the moisture ratio of the granulated powder is preferably 3% or below.

When the moisture ratio of the granulated powder is 3% or below, the bridging of the granulated powder inside the mold can be eliminated. In consequence, a molding free from the pores can be obtained, and the relative specific gravity of at least 90% can be accomplished. Here, the term "moisture ratio" represents the proportion of the moisture (percentage) contained in the granulated powder, and can be measured by use of a known moisture meter.

In the production method described in any of the fifth to eighth aspects of the invention, a bulk specific gravity of the molding obtained after granulation and molding of the raw material powder can be at least 50%.

When the bulk specific gravity of the molding formed by molding the granulated powder obtained by granulation of the raw material powder is set to at least 50%, the occurrence of the pores inside the ceramic element obtained after sintering this molding can be prevented, and a ceramic element satisfying the relative specific gravity of at least 90% can be easily obtained.

When the raw material powder having a mean particle size of 0.1 to 1.0 $\mu$m is used to prepare the granulated slurry in the production method described in any of the fifth to eighth aspects of the invention, the raw material powder is converted to spheres through the pulverization operation. In this case, the raw material powder can be converted to powder having sphericalness Y, defined by the maximum particles size R max and the minimum particle size R min and expressed by the following equation (1), of at least 80%:

$$Y=(R\min/R\max)\times 100(\%) \quad (1)$$

The invention relates to the shape of the raw material powder described above.

The granulated slurry prepared from the mixture of the raw material powder and the binder is used to form the granulated powder. When this granulated powder is molded by use of the metal mold, the granulated powder must smoothly flow into the mold. The granulated powder preferably comprises perfect spheres to conduct molding without forming the bridging inside the mold.

Studies made by the present inventors have revealed that sphericalness Y of the raw material powder is preferably 80% or more to obtain the granulated powder of prefect spheres. In this case, the granulated powder becomes more spherical. Therefore, the bridging of the granulated powder inside the mold can be eliminated in the same way as in the eighth aspect of the invention. It is therefore possible to obtain the molding free from the pores and to easily accomplish the relative specific gravity of 90% or more.

The present inventors have furthered their studies concerning the binder to be added to the ceramic raw material powder for granulating the ceramic raw material powder, and have found that the condition of the pores of the molding varies depending on a degree of polymerization and a degree of saponification of the binder.

In other words, the crushing property of the granulated power varies depending on the properties of the binder to be added. When the granulated powder is not easily crushed, the particles of the ceramic raw material powder are not tightly bonded to one another and eventually, pores occur in the molding.

As a result of the analysis of the cause described above, the pores of the molding can be eliminated and the specific gravity of the ceramic element obtained after sintering can be improved to 90% or more.

A ninth aspect of the invention is based on the observation given above, and provides a method of producing a ceramic element formed of a sintered body obtained by mixing a binder for granulating ceramic raw material powder with the ceramic raw material power made of a metal oxide and sintering the mixture, wherein the ceramic powder is prepared by a liquid phase method, the binder is an organic binder having a degree of polymerization of 2,000 or below and a degree of saponification of at least 45%, and the mixture of the ceramic raw material powder and the organic binder is granulated, molded and sintered so that the sintered body has a relative specific gravity X, expressed by the following equation (2), of at least 90%

First, as this invention uses the liquid phase method, it can make the composition of the ceramic raw material powder move uniform.

Studies made by the present inventors have experimentally revealed that when an organic binder having a degree of polymerization of 2,000 or below and a degree of saponification of at least 45% is used as the binder, the binder uniformly permeates into the gaps among the particles of the raw material powder when the mixture of the raw material powder and the binder is molded, irrespective of the mean particle size of the ceramic raw material powder. In other words, it has been found out that when the organic binder is added, fluidity and the collapsing property of the granulated powder can be improved, and a molding free from the pores can be obtained.

Therefore, the granulated power becomes one in which the particles of the ceramic raw material powder are tightly bonded to one another. In the molding obtained by molding such granulated powder, the occurrence of the pores can be suppressed, and a ceramic element comprising the sintered body having a relative specific gravity of at least 90% can be obtained.

Therefore, this invention can make the ceramic raw material composition much more uniform than the prior art method, can reduce the pores and can improve the relative specific gravity X. As a result, the invention can reduce variance of the resistance value of the ceramic element.

At least one member selected from the group consisting of polyvinyl alcohol, polyacetal and polyvinyl acetate alcohol can be appropriately used as the organic binder described above.

Preferably, the ceramic element is ceramic element is a thermistor element formed of a mixed sintered body $(M1M2)O_3 \cdot AOx$ of a compound oxide expressed by $(M1M2)O_3$ and a metal oxide expressed by AOx, M1 in the compound oxide $(M1M2)O_3$ is at least one kind of elements selected from the Group 2A and the Group 3A of the Periodic Table with the exception of La, M2 is at least one kind of elements selected from the Groups 3B, 4A, 5A, 6A, 7A and 8 of the Periodic Table, and the metal oxide AOx is a metal oxide having a melting point of 1,400° C. or above and a resistance value of at least 1,000 Ω at 1,000° C. as a single substance of AOx in the form of said thermistor element.

When the ceramic element is used as a thermistor element for a temperature sensor that is used in a broad temperature range, it is advisable to use a mixed sintered body $(M1M2)O_3$ of a compound oxide of a perovskite structure having relatively low resistance characteristics from room temperature to 1,000° C. and a metal oxide AOx having a high resistance value and a high melting point.

When a metal oxide having a melting point of 1,400° C. or above and a resistance value of at least 1,000 Ω at 1,000°

C. as a single substance of AOx in the form of said thermistor element is used, the resistance value of the mixed sintered body in the high temperature range can be elevated, and its melting point and heat resistance can be raised. Therefore, high temperature stability of the thermistor element can be improved.

Accordingly, the invention can provide a thermistor element having a resistance value of 100 Ω to 100 KΩ in the temperature range of room temperature to 1,000° C., exhibiting a small change of the resistance value due to thermal history, excellent in stability and usable in a broad temperature range.

Here, it is preferred that a molar fraction a of the compound oxide $(M1M2)O_3$ and a molar fraction b of the metal oxide AOx in the mixed sintered body $(M1M2)O_3 \cdot AOx$ satisfy the relation $0.05 \leqq a < 1.0$, $0 < b \leqq 0.95$ and $a+b=1$.

When these molar fractions a and b satisfy the relation described above, the thermistor element can more reliably accomplish the intended effects (resistance value within a predetermined range and resistance stability). Because the molar fractions can be changed in such a broad range, the resistance value and the resistance temperature coefficient can be variously controlled within a broad range when $(M1M2)O_3$ and AOx are appropriately mixed and sintered.

As to each metal element in the compound oxide $(M1M2)O_3$, it is preferred from the aspect of the practical application that M1 in the compound oxide $(M1M2)O_3$ is at least one kind of elements selected from the group consisting of Mg, Ca, Sr, Ba, Y, Ce, Pr, Nd, Sm, Eu, Gd, Tb, Dy, Ho, Er, Yb and Sc, and M2 is at least one kind of elements selected from the group consisting of Al, Ga, Ti, Zr, Hf, V, Nb, Ta, Cr, Mo, W, Mn, Tc, Re, Fe, Co, Ni, Ru, Rh, Pd, Os, Ir and Pt.

Concrete examples of the metal element A in the metal oxide AOx are at least one kind of elements selected from the group consisting of B, Mg, Al, Si, Ca, Sc, Ti, Cr, Mn, Fe, Ni, Zn, Ga, Ge, Sr, Y, Zr, Nb, Sn, Ce, Pr, Nd, Sm, Eu, Gd, Tb, Dy, Ho, Er, Tm, Yb, Lu, Hf and Ta.

The metal oxide AOx is at least one kind of metal oxides selected from the group consisting of $B_2O_3$, MgO, $Al_2O_3$, $SiO_2$, $Sc_2O_3$, $TiO_2$, $Cr_2O_3$, MnO, $Mn_2O_3$, $Fe_2O_3$, $Fe_3O_4$, NiO, ZnO, $Ga_2O_3$, $Y_2O_3$, $ZrO_2$, $Nb_2O_3$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_5$, $2MgO \cdot SiO_2$, $MgSiO_3$, $MgCr_2O_4$, $MgAl_2O_4$, $CaSiO_3$, $YAlO_3$, $Y_3Al_5O_{12}$, $Y_2SiO_5$ and $3Al_2O \cdot 2SiO_2$.

All these metal oxides exhibit high resistance values and high heat resistance, and contribute to the improvement of performance of the thermistor element.

It is preferred that in the compound oxide $(M1M2)O_3$, M1 is Y, M2 is Cr and Mn and the metal oxide AOx is $Y_2O_3$.

At this time, the mixed sintered body is $Y(CrMn)O_3 \cdot Y_2O_3$. This mixed sintered body is appropriately used for the temperature sensor and can exhibit high performance in a broad temperature range.

The mixed sintered body $(M1M2)O_3 \cdot AOx$ contains at least one member selected from CaO, $CaCO_3$, $SiO_2$ and $CaSiO_3$ as a sintering aid. Therefore, a ceramic element as a thermister device having a high sintering density can be obtained.

The invention further provides a temperature sensor having the ceramic element produced by any of the production methods described above as a thermistor element.

The ceramic element produced by the production methods described above reduces variance of the resistance value and has higher temperature accuracy than the prior art level. The temperature sensor using such a ceramic element as the thermistor element can detect the temperature in a broad temperature range and can provide a high-performance temperature sensor because the resistance variance is small.

Incidentally, numbers in parentheses represent a correspondence relation to concrete means described in the later-appearing embodiments.

Figure 1:
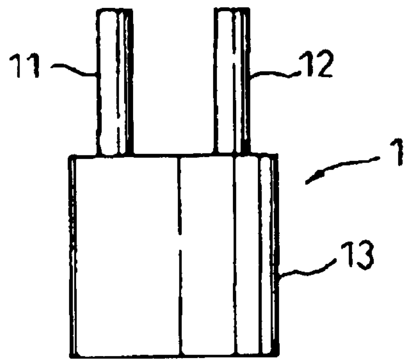
FIG. 1 is a structural view showing an example of a thermistor element according to the invention.

DESCRIPTION OF THE PREFERRED EMBODIMENTS (I) The thermistor element of this embodiment is a thermistor element formed of a metal oxide sintered body, and aims at making uniform the composition by finely granulating the thermistor raw materials in order to reduce variance of the composition of the thermistor raw materials.

In other words, in the preparation of the raw materials, a precursor solution prepared by uniformly mixing and dispersing the raw material components in a liquid phase, or a slurry solution dispersing therein particles of metals or metal oxides, is sprayed by use of atomizing means to form droplet particles. The droplet particles are heat-treated by heat-treating means to obtain thermistor raw material powder consisting of fine particles and having a uniform composition (this powder has the same composition as that of the raw materials and that of the final metal oxide sintered body).

The precursor solution, in which the precursors of the metal oxides in the final metal oxide sintered body are mixed in the liquid phase, is used as the starting material of thermistor raw material powder to form the droplet particles, and the droplet particles are then heat-treated to obtain thermistor raw material powder having a uniform composition and the fine particles. An example of such a precursor solution is a solution containing at least one kind of metal ion complex.

The slurry solution, in which particles of metals or metal oxides are dispersed, is also used as the starting material of the thermistor raw material powder to form the droplet particles, and the droplet particles are heat-treated to obtain thermistor raw material powder having a uniform composition and the fine particles. More suitable thermistor raw material powder can be obtained when the metal particles or the metal oxide particles of the slurry solution have a particle size of 100 nm (nano-meters) or below.

[Metal Oxide Sintered Body]

The metal oxide sintered body constituting the thermistor element of this embodiment suitably comprises a mixed sintered body $(M1M2)O_3 \cdot AOx$ prepared by mixing a compound oxide expressed by the formula $(M1M2)O_3$ and a metal oxide expressed by AOx, and sintering the mixture.

Here, M1 in the compound oxide $(M1M2)O_3$ is at least one kind of elements selected from the elements of Groups 2A and 3A of the Periodic Table with the exception of La, and M2 is at least one kind of elements selected from Groups 3B, 4A, 5A, 6A, 7A and 8 of the Periodic Table. Here, La is not used as M2 because it has a high moisture absorption property, reacts with the moisture in air to form an unstable hydroxide and breaks the thermistor element.

Concretely, the elements of Group 2A to serve as M1 are selected from among Mg, Ca, Sr and Ba, and the elements of Group 3A are selected from among Y, Ce, Pr, Nd, Sm, Eu, Gd, Tb, Dy, Ho, Er, Yb and Sc.

At least one kind of the elements of M2 are selected from among Al, and Ga as the elements of Group 3B, Ti, Zr and Hf as the elements of Group 4A, V, Nb and Ta as the elements of Group 5A, Cr, Mo and W as the elements of Group 6A, Mn, Tc and Re as the elements of Group 7A and Fe, Co, Ni, Ru, Rh, Pd, Os, Ir and Pt as the elements of Group 8.

The elements M1 and M2 can be combined in an arbitrary combination to obtain a desired resistance value characteristic. The compound oxide $(M1M2)O_3$ prepared by appropriately selecting M1 and M2 has a low resistance value and a low resistance temperature coefficient (for example, 1,000 to 4,000 (K)). $Y(Cr, Mn)O_3$, for example, can be suitably used as M1 and M2. When a plurality of elements are selected for M1 or M2, a molar ratio of each element can be suitably set in accordance with the desired resistance value characteristic.

However, when the compound oxide $(M1M2)O_3$ is used alone as the thermistor material, stability of the resistance value is not sufficient, and the resistance value in the high temperature range is likely to drop. Therefore, this embodiment mixes the metal oxide AOx as a material that stabilizes the resistance value of the thermistor element and keeps it within a desired range.

In this sense, the metal oxide AOx (1) must have a high resistance value in the high temperature range and (2) must be excellent in heat resistance and must be stable at high temperatures.

More concretely, as to the requirement (1), the resistance value of AOx as the single substance (not containing $(M1M2)O_3$)at 1,000° C. must be 1,000 Ω in the form and size of the ordinary thermistor element used as the sensor. As to the requirement (2), the metal oxide AOx must have a melting point of 1,400° C. or above and must be sufficiently higher than the customary maximum temperature of the sensor, i.e. 1,000° C.

To satisfy the requirements (1) and (2) described above, the metal A in the metal oxide AOx is at least one kind of elements selected from the group consisting of B, Mg, Al, Si, Ca, Sc, Ti, Cr, Mn, Fe, Ni, Zn, Ga, Ge, Sr, Y, Zr, Nb, Sn, Ce, Pr, Nd, Sm, Eu, Gd, Tb, Dy, Ho, Er, Tm, Yb, Lu, Hf and Ta.

More concretely, the metal oxide AOx is at least one kind of metal oxides selected from the group consisting of $B_2O_3$, $MgO$, $Al_2O_3$, $SiO_2$, $Sc_2O_3$, $TiO_2$, $Cr_2O_3$, $MnO$, $Mn_2O_3$, $Fe_2O_3$, $Fe_3O_4$, $NiO$, $ZnO$, $Ga_2O_3$, $Y_2O_3$, $ZrO_2$, $Nb_2O_5$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_3$, $2MgO \cdot SiO_2$, $MgSiO_3$, $MgCr_2O_4$, $MgAl_2O_4$, $CaSiO_3$, $YAlO_3$, $Y_3Al_3O_{12}$, $Y_2SiO_3$ and $3Al_2O \cdot 2SiO_2$.

A suitable example of the metal oxide AOx that has a high resistance value and is excellent in heat resistance is $Y_2O_3$. When Y is selected as M1 and Cr and Mn are selected as M2 in the compound oxide $(M1M2)O_3$, for example, the mixed sintered body $(M1M2)O_3 \cdot AOx$ is expressed as $Y(CrMn)O_3 \cdot Y_2O_3$. The thermistor element comprising this mixed sintered body can be suitably used for the temperature sensors and can exhibit high performance in a broad temperature range.

When a molar fraction of the compound oxide $(M1M2)O_3$ in the mixed sintered body $(M1M2)O_3 \cdot AOx$ is a and a molar fraction of the metal oxide AOx is b, a and b preferably satisfy the relation $0.05 \leqq a < 1$, $0 < b \leqq 0.95$ and $a+b=1$.

The desired resistance value and the low resistance temperature coefficient as the thermistor can be accomplished when the molar fractions a and b are suitably selected within the range described above. Because the molar fractions a and b can be changed within a broad range, the resistance value characteristics can be variously controlled within a broad range.

The mixed sintered body $(M1M2)O_3 \cdot AOx$ can contain at least one of $CaO$, $CaCO_3$, $SiO_2$ and $CaSiO_3$ as a sintering aid.

These sintering aid have the function of forming a liquid phase at a sintering temperature of the mixture of $(M1M2)O_3$ and AOx, and promoting sintering. In consequence, the sintering density of the resulting mixed sintered body can be improved, the resistance value of the thermistor element can be stabilized, and variance of the resistance value can be reduced with respect to the change of the sintering temperature. The amount of addition of these sintering aids can be suitably adjusted depending on their kind.

[Thermistor Element Construction and Temperature Sensor Construction]

Figure 2A:
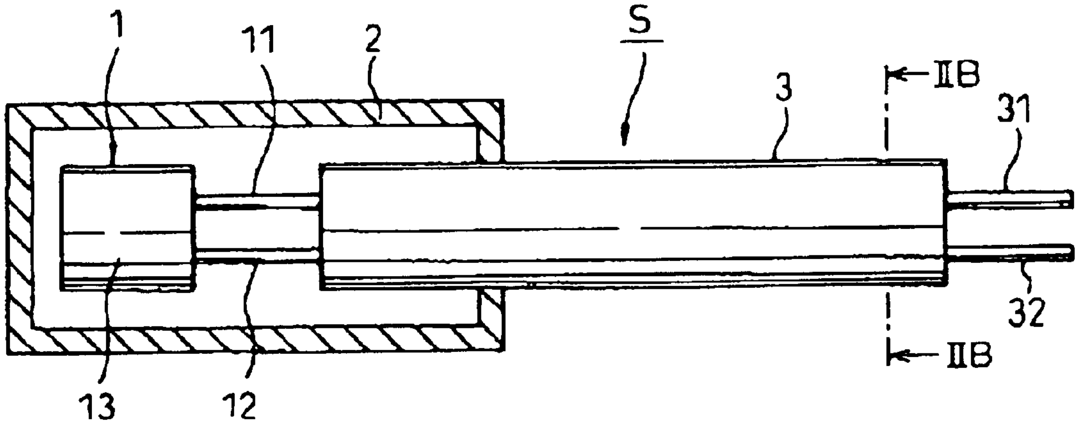
FIGS. 2(*a*) and 2(*b*) are schematic sectional views each showing an example of a temperature sensor having a built-in thermistor element shown in FIG. 1.
Figure 2B:
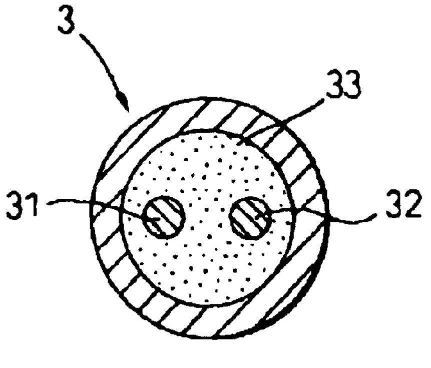

Next, an example of a construction of the thermistor element and a construction of the temperature sensor using this thermistor element are shown in the drawings. FIG. 1 is a structural view of the thermistor element 1 formed of the mixed sintered body $(M1M2\ )O_3 \cdot AOx$ described above. FIG. 2 is a schematic sectional view of the temperature sensor S having the thermistor element 1 built therein. Incidentally, FIG. 2(*b*) is a sectional view taken along a line IIB—IIB in FIG. 2(*a*).

As shown in FIG. 1, the thermistor element 1 has a shape in which each end portion of two parallel lead wires 11 and 12 is buried into a device portion 13. The mixed sintered body described above is molded into a cylinder having an outer diameter of 1.60 mm, for example, to form the device portion 13.

As shown in FIG. 2, the temperature sensor S has a cylindrical heat-resistant metal case 2, and the thermistor element 1 is arranged in its left half portion. One of the ends of a metal pipe 3 that extends from outside is positioned inside the right half portion of the metal case 2.

The metal pipe 3 holds lead wires 31 and 32 therein as shown in FIGS. 2(*a*) and 2(*b*). These lead wires 31 and 32 pass through the inside of the metal pipe 3 to reach the inside of the metal case 2, and are respectively connected to the lead wires 11 and 12 of the thermistor element 1.

Each of these lead wires 11 and 12 has a diameter of 0.3 mm and a length of 5.0 mm, for example, and is made of Pt100 (pure platinum). Incidentally, magnesia powder 33 is filled into the metal pipe 3 as shown in FIG. 2(*b*), and secures insulation of the lead wires 31 and 32 inside the metal pipe 3.

Next, production methods of the thermistor element described above will be explained. These production methods represent in various ways the forms of the starting raw materials and preparation methods of the thermistor raw materials. All the production methods include the steps of forming the droplet particles of the starting raw materials, obtaining thermistor raw material powder by use of heat-treating and recovering means, and molding and sintering this thermistor raw material powder.

[First Production Method]

The first production method comprises a step of mixing a precursor of the metal oxide constituting the metal oxide sintered body of the thermistor element in a liquid phase, and preparing the precursor solution, a step of spraying the precursor solution to obtain the droplet particles, a step of heat-treating the droplet particles and obtaining thermistor raw material powder, and a step of molding the thermistor raw material powder into a predetermined shape and sintering the resulting molding to obtain the metal oxide sintered body.

The precursor of the metal oxide is concretely single substances or salts of the metals M1, M2 and A in the mixed sintered body $(M1M2)O_3 \cdot AOx$ described above. Such a precursor (starting raw material) is dissolved in an organic or inorganic solvent (water, an organic solvent, a mixed solution of water and an organic solvent, etc) to obtain a complex of these metal ions. This is the precursor solution. The raw materials are mixed uniformly and in a desired ratio under the state of the precursor solution so that a composition ratio of the target mixed sintered body can be obtained.

In the step of spraying the precursor solution and obtaining the droplet particles, the precursor solution prepared by mixing the raw materials in a desired proportion in the liquid phase is sprayed by use of atomizing means such as a two-fluid nozzle, an injection nozzle or a ultrasonic atomizer to obtain the droplet particles. Here, the two-fluid nozzle simultaneously jets the gas and the liquid and obtains micro-droplets.

The injection nozzle mechanically ejects the liquid by a piezoelectric or electromechanical converter and obtains the droplet particles. The ultrasonic atomizer imparts a ultrasonic wave to the liquid, vibrates it and generates mist (droplets). These atomizing means are generally known in the art.

The droplet particles so obtained are fine particles successively keeping the uniform mixture state of the precursor solution. The droplet particles are then heat-treated (heat-decomposed or burnt) to obtain the thermistor raw material powder. Here, when the diameter of the droplet particles is not greater than 100 $\mu$m, a thermistor element having more uniform composition can be achieved more easily due to fine granulation of the thermistor raw material powder.

Heat-treatment of the droplet particles employs an electric furnace. This heat-treatment removes the liquid of the droplet particles, oxidizes the metal components in the droplet particles (the metals M1, M2 and A described above) to metal oxides, and acquires the thermistor raw material powder as the fine particles of the mixed sintered body $(M1M2)O_3 \cdot AOx$.

The resulting thermistor raw material powder is recovered by using recovering means suitable for recovering the powder raw material such as a cyclone, a filter or an electric precipitator. The thermistor raw material powder is heat-treated to stabilize the crystal and to remove residual carbon. Thereafter the thermistor raw material powder is mixed with a binder such as PVA (polyvinyl alcohol) and the mixture is pulverized to give granulated slurry as a mixture of the thermistor raw material powder and the binder.

Next, this granulated slurry is granulated and dried by use of a spray dryer, is molded to a predetermined shape while assembling therein lead wires 11 and 12 of Pt, etc (see FIG. 1), and is then sintered. In this way, there is obtained a high-performance thermistor element 1 formed of the mixed sintered body $(M1M2)O_3 \cdot AOx$.

In this molding step, a mold into which the lead wires are in advance inserted may be used to carry out molding. Alternatively, it is possible to bore holes for fitting the lead wires in the molding and to conduct sintering after the lead wires are fitted. It is further possible to bond the lead wires after sintering.

Still alternatively, it is possible to employ a production method that first adds and mixes a binder, resin materials, etc, with the thermistor raw material powder to viscosity and hardness suitable for extrusion molding, conducts extrusion molding of the mixture, successively fits the lead wires, and then conducts sintering. In this way, there can be obtained a thermistor element 1 having the lead wires 11 and 12 formed therein.

According to the first production method of this embodiment, mixing of the raw materials can be done under the state of the precursor solution. In other words, the composition for obtaining the final metal oxide sintered body can be regulated more uniformly under the fine liquid phase state than in the solid phase state according to the prior art, and the composition of the resulting thermistor raw material powder can be made move uniform. Unlike the solid phase method according to the prior art, the first production method is free from mixing of the pulverization medium as the impurity.

The metal oxide sintered body $(M1M2)O_3 \cdot AOx$ formed by molding and sintering this raw material powder, that is, the thermistor element 1 of this embodiment, has lowered variance of the resistance value and can obtain higher temperature accuracy than the prior art level.

[Second Production Method]

The second production method comprises a step of preparing a slurry solution dispersing therein metal or metal oxide particles, a step of spraying the slurry solution and obtaining droplet particles, a step of heat-treating the droplet particles and obtaining thermistor raw material powder, and a step of molding the thermistor raw material powder into a predetermined shape, sintering the molding and obtaining the metal oxide sintered body described above.

In other words, the second production method is different from the first production method described above in that it uses the slurry solution in place of the precursor solution described above. The slurry solution is prepared by dispersing the particles of the single substances or oxides (starting raw materials) of the metals M1, M2 and A in the mixed sintered body $(M1M2)O_3 \cdot AOx$ in an organic or inorganic solvent (water, an organic solvent, a mixed solution of water and the organic solvent, etc).

The starting raw materials are mixed in a desired proportion so that a composition ratio of the target mixed sintered body can be obtained under this slurry solution state. To uniformly mix the raw materials, the particles of the metals or metal oxides dispersed in the slurry solution preferably have a mean particle size of not greater than 100 nm. In this case, variance of the resistance value of the thermistor element can be reduced and performance can be improved due to the uniform composition.

With the exception of this slurry solution, the second production method is the same as the first production method. Therefore, when the steps such as spraying, heat-treatment, recovery, molding, sintering, and so forth, are likewise carried out, a high-performance thermistor element having a uniform composition and less variance of the resistance value can be obtained. In other words, the second production method can obtain the same effect as that of the first production method.

[Third Production Method]

In the first and second production methods described above, the third production method uses a mixture, to which an inflammable solvent is added, as the precursor solution or the slurry solution.

When the starting raw materials in the solution are heat-treated as the droplet particles, thermal decomposition and combustion of the droplet particles rapidly proceed and the fine thermistor raw powder can be obtained with a more uniform composition because the inflammable solvent is added and mixed. In consequence, variance of the resistance value of the thermistor element can be reduced and its performance can be improved owning to the uniform composition.

Here, the inflammable solvent is a member selected from the group consisting of methanol, ethanol, isopropyl alcohol, ethylene glycol and acetone. With the exception of the addition of the inflammable solvent, the third production method is the same as the first production method. Therefore, the process steps such as spraying, heat-treatment, recovery, molding, sintering, and so forth, can be carried out in the same way as in the first production method.

[Production Method of Thermistor Raw Materials]

Figure 3:
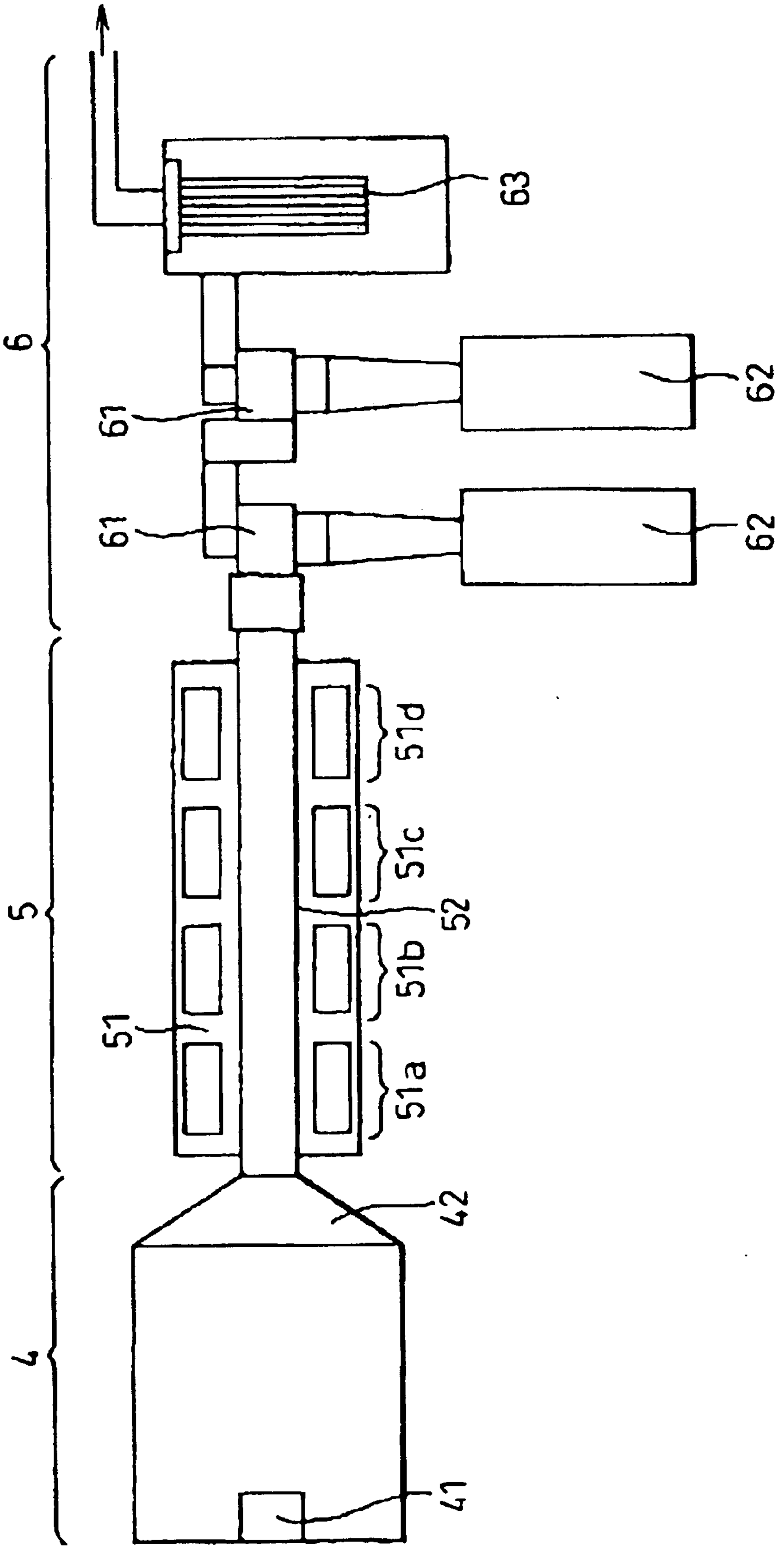
FIG. 3 is a schematic view typically showing a construction of a production apparatus of thermistor raw materials.

FIG. 3 shows a production apparatus for concretely accomplishing the first to third production methods described above. This production apparatus includes atomizing means for spraying the precursor solution or the slurry solution described above and obtaining the droplet particles, heating means (heat-treatment means) 5 for heat-treating the droplet particles and obtaining the thermistor raw material powder and recovering means 6 for recovering the thermistor raw material powder. The atomizing means 4, the heating means 5 and the recovering means 6 are serially connected in the order named.

The atomizing means 4 can use a two-fluid nozzle, an injection nozzle or an ultrasonic atomizer as described above. However, the atomizing means preferably can change the nozzle angle at an arbitrary angle to the heating means 5 and can spray an arbitrary amount of the droplets. Preferably, the atomizing means 4 can arbitrarily change the flow of the droplet particles to a laminar flow, a turbulent flow, a rotating flow, and so forth.

When the nozzle angle and the spray amount are changed, the droplet particles can be fed in accordance with the sizes and shapes of an atomization tank 42 and the heating means 5. It is possible, for example, to prevent the droplet particles sprayed from impinging against the inner wall of the atomization tank 42 and that of the heating means 5, and from dewing. When the flow of the droplet particles is changed, the retention time, etc, inside the heating means 5 can be controlled in accordance with the composition of the raw materials.

It is particularly preferred to introduce the droplet particles under the rotating flow state into the heating means 5 of the subsequent stage. Because the droplet particles move while turning inside the heating means 5, the traveling distance of the droplet particles inside the heating means can be extended.

In view of the factors described above, the atomization means 4 in the example shown in FIG. 3 includes the two-fluid nozzle 41 for spraying the droplet particles and the atomization tank 42 as an atomization chamber from which the droplet particles are sprayed. The two-fluid nozzle 41 uses a gas selected from air, nitrogen and oxygen as its carrier gas and sprays the precursor solution or the slurry solution.

The atomizing means 4, the heating means 5 and the recovering means 6 that are interconnected to one another constitute a tank through which the thermistor raw material powder flows. A blower, for example, directly connected to the recovering means 6 keeps the inside of this tank at a negative pressure. Since the internal pressure of the tank is thus kept at a negative pressures, a smooth flow of the droplet particles can be created, and thermistor raw material powder (synthetic raw materials) having a more stabilized uniform composition can be obtained.

When the inside of the tank is not at a negative pressure, it is possible to employ a construction in which a hole (gas introducing means, not shown) for introducing a gas from outside the atomization tank (atomization chamber) of the atomizing means 4 into the inside is formed, and air is introduced from this hole along the flow of the droplet particles generated by the two-fluid nozzle 41. The flow of the gas introduced from the gas introducing means into the atomization tank 42 can make the flow of the sprayed droplet particles smooth.

In the example shown in FIG. 3, the heating means 5 includes a quartz hollow tube 52 one of the ends of which is connected to the atomization tank 42 and the other end of which is connected to the recovering means 6, and an electric furnace arranged round the outer periphery of the quartz hollow tube 52. The end portion of the hollow tube 52 on the side of the atomization tank 42 is an inlet of the droplet particles and its end portion on the recovering means is an outlet of the heat-treated thermistor raw material powder.

The electric furnace 52 constitutes at least one temperature zone controlled to a predetermined temperature between the inlet and the outlet of the quartz hollow tube 52. In this embodiment, four zones 51*a*, 51*b*, 51*c* and 51*d* are constituted so that the temperature can be so controlled as to become progressively higher from the inlet (upstream side) of the droplet particles towards the outlet (downstream side).

When the construction of these temperature zones 51*a* to 51*d* and the temperature control form are regulated, the temperature can be set in accordance with the thermal behavior of the starting raw materials. Therefore, thermistor raw material powder having more uniform composition can be synthesized.

The recovering means 6 may be equipped with a cyclone, a filter or an electric precipitator suitable for recovering the thermistor raw material powder as the powdery raw material as described already. In the example shown in FIG. 3, the cyclone 61 is arranged on the upstream side and the filter (bag filter) 63, on the downstream side. Incidentally, the electric precipitator may be used in place of the filter 63 on the downstream side.

In the recovering means 6 of this embodiment, the cyclone 61 suitable for recovering large amounts of raw material powder having a relatively large particle size is arranged on the upstream side and the filter 63 or the electric precipitator suitable for recovering raw material powder having a relatively small particle size is arranged on the downstream side. In this way, means more suitable for recovering the finer powder raw material can be constituted.

In this embodiment, two cyclones 61 are connected in series. A recovering jar 62 made of a stainless steel is added to the lower part of each cyclone 61 so that the thermistor raw material powder flowing through the hollow tube 52 is stored in each recovering jar 62. The filter 63 after the cyclone 61 recovers micro-powder that cannot be collected by the cyclone 61.

The recovering means 6 is preferably operated while its temperature is controlled to a range of 100 to 200° C. The temperature of the recovering means 6 can be controlled by, for example, forming a hole (secondary air introduction hole) for introducing air from outside to the inside of the recovering means 6 and regulating the air quantity so introduced.

The temperature inside the recovering means 6 is preferably 200° C. or below when the heat resistance of the material of the filter 63 used for the recovering means 6 and efficiency of the electric precipitator are taken into account, but is 100° C. or above lest the vapor occurring in the heating means 5 dews and wets the recovered thermistor raw material powder.

Owing to the construction described above, this production apparatus can consecutively carry out the step of spraying the precursor solution or the slurry solution from the atomizing means 4 and forming the droplet particles, the step of heat-treating the droplet particles by the heating means 5 to form the thermistor raw material powder and the step of recovering the thermistor raw material powder by the recovering means 6.

Therefore, the invention can provide the production apparatus that can appropriately accomplish the first to third production methods of this embodiment, can select the operation time and the scale of the apparatus in accordance with the production quantity and can continuously obtain the thermistor raw material powder.

In the production apparatus shown in FIG. 3, the heating means 5 can control the temperature so that the temperature progressively increases from the inlet of the droplet particles towards the outlet. Therefore, there is the advantage that the heat-treating temperature of the droplet particles can be gradually increased in the heat-treating step of the droplet particles.

If the heat-treating temperature of the droplet particles is drastically increased, the droplet particles rupture and the resulting thermistor raw material powder is likely to become amorphous. When the amorphous thermistor raw material powder is sintered, pores (air entrapment portions) are likely to develop inside the resulting sintered body.

When the heat-treating temperature of the droplet particles is gradually increased, the raw material powder is more likely to become perfect spheres. When the spherical thermistor raw material powder is molded and sintered, the filling property can be improved, and the pores do not occur. In consequence, it is possible to obtain the thermistor element containing the uniform sintered particles having a high packing density. Furthermore, it is possible to reduce variance of the resistance value and to obtain the high-performance thermistor element.

More concretely, the occurrence of the pores can be appropriately prevented when the sphericalness X, that is defined by the ratio of the maximum particle size Rmax of the powder and its minimum particle size Rmin as expressed by the following equation (1), of the thermistor raw material powder coming out from the heating means 5 is at least 80%.

$$X=(R\min/R\max)\times 100(\%) \quad (1)$$

Sphericalness X can be measured through microscopic observation such as TEM by sampling the thermistor raw material powder from the outlet of the heating means 5, for example.

Figure 4:
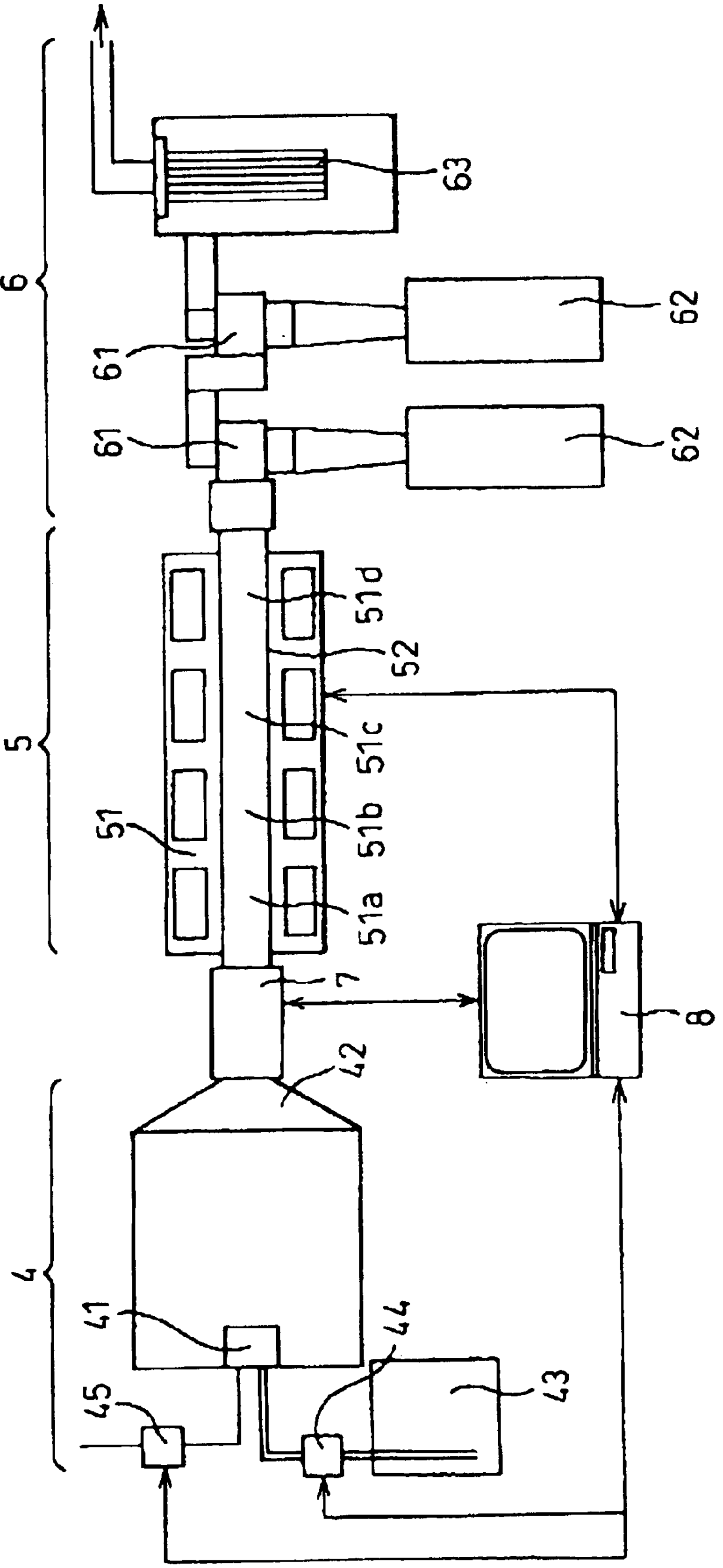
FIG. 4 is a schematic view typically showing another construction of a production apparatus of thermistor raw materials.

FIG. 4 shows another production apparatus of the thermistor raw materials according to the embodiment. In comparison with the production apparatus shown in FIG. 3, the production apparatus shown in FIG. 4 additionally includes (1) droplet diameter detecting means 7 for detecting the diameters of the droplet particles obtained from the atomizing means 4, whereby the atomizing means 4, the droplet diameter detecting means 7, the heating means 5 and the recovering means 6 are interconnected to one another in order named, and (2) arithmetic operation/controlling means 8 for conducting arithmetic operation and analysis on the basis of the droplet diameter data of the droplet diameter detecting means 7, and controlling the spray state of the atomizing means 4.

The droplet diameter detecting means 7 may be the one in which a laser diffraction system particle size measuring instrument is integrated with an evaluation cell. One of the ends of the evaluation cell is connected to the atomization tank 42 and the other end, to the hollow tube 42. The atomizing means 4 is regulated on the basis of the information of the diameter of the droplet particles obtained from the droplet diameter detecting means 7 to stabilize the process. It is possible, for example, to reduce fluctuation among the raw material lots and to make contribution to quality management of the product.

Here, the atomizing means 4 may be manually regulated. In the example shown in FIG. 4, however, the arithmetic operation/controlling means 8 automatically controls the atomizing means 4. More concretely, the arithmetic operation/controlling means 8 uses a personal computer, and controls the operation of the atomizing means 4 on the basis of the data of the droplet particle diameter from the droplet diameter detecting means 7.

The atomizing means 4 includes a raw material tank 43 for storing the precursor solution or the slurry solution, a solution quantity regulating valve 44 for regulating the solution quantity to be supplied from the raw material tank 43 to the two-fluid nozzle 41 and an air flow rate/pressure regulating valve 45 for regulating the flow rate and the pressure of air as the carrier gas to be supplied to the two-fluid nozzle 41. Incidentally, these tank 43 and valves 44 and 45 are provided to the production apparatus shown in FIG. 3, too.

In the production apparatus shown in FIG. 4, the arithmetic operation/controlling means 8 controls the operations of these valves 44 and 45. The arithmetic operation/controlling means 8 can acquire the diameter data of the droplet particles and can compute and control the temperature, the viscosity, the atomizing pressure and the atomization flow rate of the solution to be atomized.

Because the arithmetic operation/controlling means 8 regulates the flow rate of the raw materials, the flow rate of the air, the/pressure, etc, to the two-fluid nozzle 41, the droplet particle diameter atomized can be kept constant.

The arithmetic operation/controlling means 8 inputs and calculates the set temperature and the actual temperature of each temperature zone 51_a_ to 51_d_ of the electric furnace 51 as the heating means 5 and can execute output control of the electric furnace 51. Therefore, when the set temperature of each temperature zone is controlled, optimal heat-treatment can be carried out in accordance with the diameter of the droplet particles. This construction is suitable for improving sphericalness X and making uniform the composition of the resulting raw material powder.

Because the production apparatus shown in FIG. 4 includes the droplet diameter detecting means 7 and the arithmetic operation/controlling means 8, a higher level of control can be conducted, and the change of the power source voltage in the atomizing means 4 and in the heating means 5 and the change of the nozzle pressure can be fed back to the arithmetic operation/controlling means 8 for achieving the feedback control.

Therefore, the process can be further stabilized and a contribution can be made to the quality management of the product. In consequence, variance among the raw material lots can be eliminated and a high-performance thermistor element having stable quality can be obtained. The arithmetic operation/controlling means 8 makes it possible to achieve a continuous automatic operation of the production apparatus, and this operation can reduce the cost and can stabilize the quality of the thermistor raw materials.

[Fourth Production Method]

The production method using the production apparatus shown in FIG. 4 is described in the explanation of the production apparatus, but is hereby summarized as the fourth production method of this embodiment.

The fourth production method includes the step of preparing the precursor solution or the slurry solution used in the first to third production methods, the step of spraying the solution and obtaining the droplet particles, the step of heat-treating the droplet particles and obtaining the thermistor raw material powder, the step of detecting the diameter of the droplet particles and controlling the spraying condition and the heat-treating condition on the basis of the data of the particles so detected, and the step of molding the thermistor raw powder into a predetermined shape and sintering the molding to obtain the metal oxide sintered body.

[Characteristics of Thermistor Element]

The thermistor element 1 of this embodiment obtained by each production method described above is a mixed sintered body $(M1M2)O_3 \cdot AOx$ in which $(M1M2)O_3$ and AOx are uniformly mixed through the crystal grain. This thermistor element 1 exhibits a low resistance value of 100 Ω to 100 KΩ necessary for a temperature sensor S from room temperature (27° C., for example) to a high temperature range of about 1,000° C., and its resistance temperature coefficient β can be regulated to a range of 2,000 to 4,000 (K).

Temperature accuracy is evaluated for 100 temperature sensors 5 each incorporating the thermistor element 1 of this embodiment. The evaluation method of temperature accuracy is as follows. A standard deviation σ of the resistance values at 800° C. is calculated from the resistance value temperature data of the 100 temperature sensors, and 6 times this standard deviation σ is used as a variance width (on both sides) of the resistance value. The resistance value variance width is converted to the temperature, and the conversion value is halved to a value A. Temperature accuracy is expressed as ±A° C.

As a result, temperature accuracy of all the temperature sensors is below a ±5° C. level. Temperature accuracy of this level is sufficiently high and can be adapted to the system for detecting the exhaust temperatures before and after the automobile exhaust gas catalyst described already.

As described above, when producing a thermistor element formed mainly of a metal oxide, this embodiment can make the composition of the thermistor raw materials further uniform, can reduce variance of the resistance value of the thermistor element and can provide a temperature sensor having higher temperature accuracy than the prior art level.

(II) The ceramic element of this embodiment comprises the sintered body (metal oxide sintered body) obtained by molding the ceramic raw materials of the metal oxide to obtain the molding substantially free from the pores, and then sintering the molding. The thermistor element is suitable for the thermistor element capable of detecting a temperature from room temperature to a high temperature range of 1,000° C. or above.

This ceramic element uses raw material powder prepared by the liquid phase method and having a mean particle size of 0.1 to 1.0 μm as the ceramic raw material. This raw material powder is granulated, molded and sintered to obtain the sintered body having a relative specific gravity X of at least 90% that is defined by a sintering specific gravity and a theoretical specific gravity expressed by the following equation (2):

$$\text{relative specific gravity } X = (\text{sintering specific gravity}/\text{theoretical specific gravity}) \times 100(\%) \quad (2)$$

In other words, a solution (raw material solution) dissolving or dispersing the raw materials of the metal oxides weighed to a predetermined composition ratio is first prepared. The droplet particles obtained from the solution are heat-treated (first heat-treatment) to obtain the raw material powder of the ceramic element. The resulting raw material powder is heat-treated (second heat-treatment) so that the mean particle size of the raw material powder is from 0.1 to 1.0 μm. The raw material having such a mean particle size is granulated, molded and sintered to obtain the ceramic element of this embodiment.

[Raw Material Solution]

The raw material solution (starting material) dissolving or dispersing the raw materials of the metal oxides is the solution (precursor solution) prepared by mixing the precursor of the metal oxide in the liquid phase or the solution (slurry solution) dispersing the particles of the metals or metal oxides having a mean particles size of not greater than 1.0 μm. The precursor solution contains at least one kind of metal ion.

When these solutions are prepared, mixing of the raw materials can be carried out in the liquid phase. Therefore, the composition of the ceramic raw materials can be made further uniform. When the solution is sprayed, the droplet particles can be obtained. The raw material powder obtained by conducting the first heat-treatment for the droplet particles is granulated much more than the powder obtained by the solid phase method according to the prior art. The droplet particles are micro-particles having a mean particle size of 30 to 50 nm (nano-meters), for example.

The fine raw material powder obtained by this liquid phase method further grow due to the second heat-treatment and the mean particle size becomes 0.1 to 1.0 μm. The binder is added to this raw material powder and the resulting mixture is used to form granulated powder. The granulated powder is molded to obtain the molding, which is then sintered to obtain the ceramic element as the sintered body.

[Binder]

An organic binder selected from polyvinyl alcohol, polyacetal and polyvinyl acetate alcohol can be used as the binder for granulating the ceramic raw material powder. The organic binder preferably has a degree of polymerization of 2,000 or below and a degree of saponification of at least 45%.

[Metal Oxide Sintered Body]

The metal oxide sintered body constituting the ceramic element of this embodiment is the same as the one explained in [Metal oxide sintered body] of the embodiment (I). It comprises the mixed sintered body $(M1M2)O_3 \cdot AOx$ formed by mixing the compound oxide expressed by $(M1M2)O_3$ and the metal oxide expressed by AOx and sintering the mixture.

[Ceramic Element Construction and Temperature Sensor Construction]

The construction of the ceramic element as the thermistor element and the construction of the temperature sensor using this ceramic element are the same as those explained in [Ceramic element construction and temperature sensor construction] in the embodiment (I), and are shown in FIG. 1 and FIGS. 2(*a*) and 2(*b*).

Next, the fifth to eighth production methods for producing the ceramic element described above will be explained. These production methods represent, in various ways, the forms of the starting raw materials and the preparation methods of the ceramic raw materials. However, all of them include the step of forming the droplet particles from the starting materials, the step of obtaining ceramic raw material powder by heat-treatment, and the steps of granulation, molding and sintering.

[Fifth Production Method]

The fifth production method includes a step of mixing a precursor of a metal oxide in a liquid phase and preparing a precursor solution, a step of spraying the precursor solution and obtaining droplet particles, a first heat-treating step of heat-treating the droplet particles and obtaining raw material powder of a ceramic element, a second heat-treating step of heat-treating the raw material powder obtained by the first heat-treating step at a temperature higher than that of the first heat-treating step and changing a mean particle size of the raw material powder to 0.1 to 1.0 μm, and steps of granulation, molding and sintering of the raw material powder obtained by the second heat-treating step.

The precursor of the metal oxide is single substances or salts of the metals M1, M2 and A in the mixed sintered body $(M1M2)O_3 \cdot AOx$ described above. Such a precursor (starting material) is dissolved in an organic or inorganic solvent (water, organic solvent or mixed solution of water and organic solvent) to form a metal ion complex, for example. This is the precursor solution. The raw materials are uniformly mixed in a desired proportion under the state of this precursor solution so as to obtain a composition ratio of a target mixed sintered body.

In the step of spraying the precursor solution and obtaining the droplet particles, the precursor solution prepared by mixing the raw materials in a desired proportion under the liquid phase state is sprayed by use of atomizing means such as a two-fluid nozzle to obtain the droplet particles. Here, the two-fluid nozzle forms micro-droplets by simultaneously jetting the gas and the liquid.

The resulting droplet particles are micro-particles that successively keep the uniform mixing state in the precursor solution. Next, the droplet particles are heat-treated (thermal decomposition and combustion) in the first heat-treating step to obtain ceramic raw material powder.

The heat-treatment of the droplet particles in the first heat-treating step uses an electric furnace. The heat-treatment removes the liquid of the droplet particles, oxidizes the metal components (M1, M2 and A described above) in the droplet particles to the oxide to form the ceramic raw material powder as the micro-particles of the mixed sintered body $(M1M2)O_3 \cdot AOx$. The resulting ceramic raw material powder is micro-particles having a mean particle size of 30 to 50 nm, for example.

In the subsequent second heat-treating step, the ceramic raw material powder is placed into an alumina crucible and is heat-treated in the electric furnace at a temperature higher than that of the first heat-treating step so as to control the mean particle size of the raw material powder to 0.1 to 1.0 μm.

The binder such as polyvinyl alcohol is mixed (about 1 wt %, for example) with the ceramic raw material powder the mean particle size of which is controlled to 0.1 to 1 μm, and the mixture is then subjected to pulverization treatment using a medium stirring mill. There is thus obtained granulated slurry in which the binder is mixed with the ceramic raw material powder.

It is possible, in practice, to control the mean particle size of the raw material powder to be somewhat greater than 1.0 μm after the heat-treatment in the electric furnace in the second heat-treating step, and to control the mean particle size of the raw material powder (under the state of the granulated slurry) to from 0.1 to 1.0 μm when the mixture with the binder is pulverized in the next step. In either case, it is necessary that the mean particle size of the raw material powder in the granulated slurry be controlled to from 0.1 to 1.0 μm.

Next, this granulated slurry is granulated and dried by use of a spray dryer to form granulated powder (spheres having particle sizes of 30 to 60 μm and a bulk specific gravity of 1.0). This granulated powder is molded by use of a mold incorporating lead wires 11 and 12 made of Pt (see FIG. 1) into a predetermined shape to obtain a molding, and the molding is sintered (at 1,400 to 1,700° C., for example). There is thus obtained a ceramic element 1 formed of the mixed sintered body $(M1M2)O_3 \cdot AOx$.

In the molding step, it is possible to use a mold into which the lead wires are in advance inserted, or to bore holes for fitting the lead wires in the resulting molding after molding is completed, to fit the lead wires and then to conduct sintering. The lead wires may be bonded after sintering, too.

Alternatively, it is also possible to employ a method that adds and mixes the binder, the resin materials, etc, with the ceramic raw material powder, adjusts the viscosity and the hardness to the values suitable for extrusion molding, then conducts extrusion molding, fits the lead wires and sinters the molding. In this way, too, the ceramic element 1 having the lead wires 11 and 12 can be acquired.

According to the fifth production method of this embodiment, mixing of the raw materials can be made under the state of the precursor solution. In other words, the composition can be much more uniformly adjusted under the state of the finer liquid phase state than in the solid phase method according to the prior art to the composition for obtaining the final metal oxide sintered body. Therefore, the composition of the resulting ceramic raw material powder can be rendered move uniform. Unlike the solid phase method of the prior art, the fourth production method is free from mixture of the pulverization medium as the impurity.

The particles of the fine ceramic raw material powder obtained by the liquid phase method further grow in the second heat-treating step, and the mean particle size can be controlled to 0.1 to 1.0 μm. When the ceramic raw material powder the mean particle size of which is controlled as described above is used, the binder uniformly fills the gaps of the raw material powder. In consequence, the occurrence of the pores can be prevented and the ceramic element 1 having the relative specific gravity X of at least 90% can be obtained.

According to the fifth production method, the composition of the ceramic raw materials can be made uniform much more than in the production method of the prior art. Because the pores are reduced and the relative specific gravity X is improved (X≧90%), variance of the resistance value of the ceramic element can be reduced.

As a matter of fact, no pore is found when the inside of the molding and the sintered body (ceramic element) obtained in the fifth production method is observed through SEM. In other words, the granulated powder is completely crushed and the binder is uniformly added to the gaps among the particles in the molding. It is confirmed in the sintered body, on the other hand, that the sintered body has a uniform texture and the relative specific gravity X is at least 90%.

In this production method, since the granulated powder is likely to be crushed in the molding, it is possible to obtain the effect (molding load reduction effect) in that the molding load for obtaining the molding can be drastically reduced (about 50%, for example) in comparison with the case where the raw material powder by the solid phase method according to the prior art is used.

In this fifth production method, the granulated slurry is preferably granulated and dried by use of a spray dryer so that the moisture ratio of the granulated powder obtained after granulation of the ceramic raw material powder having a mean particle size of 0.1 to 1.0 μm is not greater than 3%.

Here, the term "moisture ratio" means the proportion (percentage) of the moisture contained in the granulated powder, and can be measured by use of a known moisture meter. Studies conducted by the inventors of the invention have revealed that when the moisture ratio of the granulated powder is 3% or below, the granulated powder is more likely to smoothly flow in the mold when molding of the granulated powder is conducted in the mold, and molding can be easily conducted without forming bridging inside the mold.

In other words, when the moisture ratio of the granulated powder is set to 3% or below, the bridging of the granulated powder inside the mold can be eliminated, a molding free from the pores can be obtained and the relative specific gravity of at least 90%, after sintering, can be accomplished. When the moisture ratio in the granulated powder is greater than 3%, the granulated powder is likely to adhere to the mold, the bridging is more likely to be formed and eventually, the pores are more likely to develop in the molding.

In the fifth production method described above, the molding condition (load, etc) is preferably controlled so that the bulk specific gravity of the molding obtained after molding is at least 50%. The bulk specific gravity represents the value (%) obtained by first dividing the molding specific gravity as the actual measurement value by the theoretical specific gravity, and then multiplying the quotient by 100.

When the molding has a small bulk specific gravity, it means that a large number of pores exist inside the molding. When a large number of pores exist inside the molding, a large number of pores exist in the sintered body (ceramic element) after sintering, too.

Studies conducted by the present inventors have also revealed that when the bulk specific gravity of the molding is at least 50%, the occurrence of the pores inside the ceramic element obtained after sintering the molding can be prevented, and a ceramic element satisfying the requirement for the relative specific gravity of at least 90% can be easily obtained.

When the granulated slurry is prepared by use of the raw material powder having the mean particle size of 0.1 to 1.0 μm in the fifth production method described above, the raw material powder is preferably converted to powder having sphericalness Y(=maximum particle size Rmax×100/minimum particle size Rmin) of at least 80% by converting the raw material powder to spheres through the pulverization operation.

More concretely, the medium stirring mill, or the like, conducts pulverization of the granulated slurry, and the sphericalness described above can be achieved by the pulverization condition such as the pulverization force and the time. When sphericalness Y of the raw material powder form is at least 80%, the granulated powder is likely to become substantially perfect spheres. When granulated powder that is amorphous but not spherical is molded by the mold, the flow of the granulated powder inside the mold is impeded, and the bridging is more likely to be formed.

Therefore, when the granulated powder that is substantially spherical is used for molding by the mold, the granulated powder is likely to smoothly flow to the mold and molding can be easily conducted without forming the bridge inside the mold. In other words, when sphericalness Y of the raw material powder in the granulated slurry is at least 80%, it becomes easy to eliminate the bridging of the granulated powder inside the mold, to obtain a molding devoid of the pores and to achieve the relative specific gravity of at least 90% after sintering.

[Sixth Production Method]

The sixth production method includes a step of preparing a slurry solution dispersing therein metal or metal oxide particles having a mean particle size of 1.0 μm or below, a step of spraying the slurry solution and obtaining droplet particles, a first heat-treating step of heat-treating the droplet particles and obtaining raw material powder of a ceramic element, a second heat-treating step of heat-treating the raw material powder obtained in the first heat-treating step at a temperature higher than that of the first heat-treating step, and converting the mean particle size of the raw material powder to 0.1 to 1.0 μm, and steps of granulating, molding and sintering the raw material powder obtained in the second heat-treating step.

The sixth production method is different from the fifth production method in that it uses the slurry solution in place of the precursor solution already described. The slurry solution is prepared by dissolving particles of single substances or oxides (starting materials) of the metals M1, M2 and A in the mixed sintered body ($(M1M2)O_3 \cdot AOx$) in an organic or inorganic solvent (water, organic solvent or mixed solution of water and organic solvent). The starting raw materials are mixed in a desired proportion in the form of the slurry solution so that a composition ratio of a target mixed sintered body can be obtained.

The sixth production method is the same as the fifth production method with the exception that it uses the slurry solution. Thereafter, the fifth production method conducts the steps such as spraying, first heat-treatment, second heat-treatment, granulation, molding and sintering in the same way. In consequence, the fifth production method can obtain the ceramic element 1 having a uniform composition, free from the pores and having less variance of the resistance value.

The sixth production method can obtain the same effect as that of the fifth production method. The fifth production method exhibits the molding load reducing effect, the effect of the moisture ratio of the granulated powder, the effect of the bulk specific gravity of the molding and the effect of sphericalness in the same way as in the fifth production method.

[Seventh Production Method]

The seventh production method includes a step of mixing a precursor of a metal oxide in a liquid phase and preparing a precursor solution, a step of dispersing particles of a metal or metal oxide having a mean particle size of not greater than 1.0 $\mu$m in the precursor solution and preparing a dispersion solution, a step of spraying the dispersion solution and obtaining droplet particles, a first heat-treating step of heat-treating the droplet particles and obtaining raw material powder of a ceramic element, a second heat-treating step of heat-treating the raw material powder obtained in the first heat-treating step at a temperature higher than that of the first heat-treating step and converting the mean particle size of the raw material powder to 0.1 to 1.0 $\mu$m, and steps of granulating, molding and sintering the raw material powder obtained in the second heat-treating step.

In comparison with the fifth production method, the seventh production method is different in that it uses the dispersion solution prepared by mixing the precursor solution and the slurry solution. This dispersion solution can be prepared by adding the slurry solution to the precursor solution, or by adding the particles of the metal or metal oxide to the precursor solution or by dissolving the precursor of the metal oxide in the slurry solution. The starting raw materials are mixed in a desired proportion in this dispersion solution so that a composition ratio of a target mixed sintered body can be obtained.

The seventh production method is the same as the fifth production method with the exception that it uses the dispersion solution, and thereafter conducts the steps such as spraying, first heat-treatment, second heat-treatment, granulation, molding and sintering in the same way. In consequence, the seventh production method can obtain the ceramic element 1 having a uniform composition, free from the pores and having less variance of the resistance value.

The seventh production method can obtain the same effect as that of the fifth production method. The seventh production method exhibits the molding load reducing effect, the effect of the moisture ratio of the granulated powder, the effect of the bulk specific gravity of the molding and the effect of sphericalness in the same way as in the fifth production method.

[Eighth Production Method]

The eighth production method uses ceramic raw material powder that is prepared by the liquid phase method, an organic binder having a degree of polymerization of not greater than 2,000 and a degree of saponification of at least 45% as the binder, and granulates, molds and sinters a mixture of the ceramic raw material powder and the organic binder so that the resulting sintered body achieves a relative specific gravity X of at least 90%.

The eighth production method does not depend on the mean particle size of the ceramic raw material powder produced by the liquid phase method. Therefore, the object of the invention can be accomplished even though the resulting ceramic element is sometimes outside the range of the ceramic element produced by use of the raw material powder prepared by the liquid phase method and having a mean particle size of 0.1 to 1.0 $\mu$m.

In other words, as to the ceramic raw material powder prepared by the liquid phase method in the eighth production method, it is possible to use the raw material powder obtained by conducting the first heat-treating step of the fifth production method for the droplet particles obtained from the precursor solution, or to use the raw material powder which is obtained by conducting the second heat-treating step and the mean particle size of which is controlled to from 0.1 to 1.0 $\mu$m.

In the eighth production method, too, the composition of the ceramic raw material powder can be made further uniform by use of the liquid phase method as described above.

This production method adds and mixes the organic binder having a degree of polymerization of not greater than 2,000 and a degree of saponification of at least 45% to the ceramic raw material powder, and thereafter conducts granulation, molding and sintering in the same way as the production methods described above to obtain the ceramic element 1.

When the organic binder having a degree of polymerization of not greater than 2,000 and a degree of saponification of at least 45% is used as the binder, the binder uniformly permeates into the gaps among the raw material powder when the granulated powder is formed.

Studies made by the present inventors have revealed the following. When the degree of polymerization of the binder is greater than 2,000, the granulated powder becomes hard and is not easily crushed, so that a large number of pores develop inside the molding. When the degree of saponification is less than 45%, the binder is not easily dissolved in water when the granulated slurry is prepared, and the organic solvent becomes necessary. Then, a dryer having an explosion-proof structure becomes necessary when the drying step is carried out by use of the spray dryer to form the granulated powder.

When the organic binder having a degree of polymerization of not greater than 2,000 and a degree of saponification of at least 45% is used in view of the factors described above, fluidity and collapsing property of the granulated powder can be improved when the granulated powder is prepared by mixing the binder with the ceramic raw material powder prepared by the liquid phase method, and the molding free from the pores can be obtained.

As a result, it becomes possible to obtain the granulated powder in which the particles of the ceramic raw material powder are tightly bonded to one another. Eventually, the occurrence of the pores can be restricted in the molding obtained by molding the granulated powder, and a ceramic element formed of the sintered body having a relative specific gravity X of at least 90% can be obtained.

As described above, the eighth production method, too, can make the composition of the ceramic raw materials more uniform than the prior art method, can improve the specific gravity X ($X \geqq 90\%$) by reducing the pores and can reduce variance of the resistance value of the ceramic element.

The organic binder used in this eighth production method is at least one kind of members selected from polyvinyl alcohol, polyacetal and polyvinyl acetate alcohol.

[Production Apparatus of Ceramic Raw Material Powder]

FIG. 3, described above, shows a production apparatus that can be used for a part of the fifth to eighth production methods. In these production methods, the production apparatus is used for the step of spraying the precursor solution (or the slurry solution or the dispersion solution) and obtaining the droplet particles, and the first heat-treating step of heat-treating the droplet particles and obtaining the raw material powder of the ceramic element.

The production apparatus includes atomizing means 4 for spraying the solution and obtaining the droplet particles, heating means (heat-treating means) 5 for heat-treating the droplet particles and obtaining the raw material powder of the ceramic element, and recovering means 6 for recovering the raw material powder, whereby the atomizing means 4, the heating means 5 and the recovering means 6 are interconnected to one another in the order named. The detail of these means is described already.

In the production apparatus shown in FIG. 3, the heating means 5 can control the temperature so that the temperature becomes progressively higher from the inlet to the outlet of the droplet particles. Therefore, there is the advantage that during the heat-treating step of the droplet particles, the heat-treating temperature of the droplet particles can be gradually increased.

If the heat-treating temperature of the droplet particles is drastically increased, the droplets rupture and the resulting raw material powder is likely to become amorphous. When the amorphous ceramic raw material powder is sintered, pores are likely to occur inside the sintered body as described above. At this point, when the heat-treating temperature of the droplet particles is gradually increased, the raw material powder is more likely to become perfect spheres.

[Characteristics of Thermistor Element]

The ceramic element 1 of this embodiment obtained by the production methods described above is the mixed sintered body $(M1M2)O_3 \cdot AOx$ in which $(M1M2)O_3$ and AOx are uniformly mixed through the grain boundary. This ceramic element 1 exhibits a low resistance value of 100 Ω to 100 KΩ necessary for a temperature sensor S from room temperature (27° C., for example) to a high temperature range of about 1,000° C., and its resistance temperature coefficient β can be regulated to a range of 2,000 to 4,000 (K).

Temperature accuracy is evaluated for 100 temperature sensors S each incorporating the thermistor element 1 of this embodiment. The evaluation method of temperature accuracy is as follows. A standard deviation σ of the resistance values at 800° C. is calculated from the resistance value temperature data of the 100 temperature sensors, and 6 times this standard deviation σ is used as a variance width (on both sides) of the resistance value. The resistance value variance width is converted to the temperature, and the conversion value is halved to a value A. Temperature accuracy is expressed as ±A° C.

As a result, temperature accuracy of all the temperature sensors is below a ±5° C. level. Temperature accuracy of this level is sufficiently high and can be adapted to the system for detecting the exhaust temperatures before and after the automobile exhaust gas catalyst described already.

As described above, when producing a thermistor element 1 formed mainly of a metal oxide, this embodiment can make the composition of the thermistor raw materials move uniform, and can eliminate the pores of the molding. Therefore, this embodiment can reduce variance of the resistance value of the ceramic element and can provide a temperature sensor having higher temperature accuracy than the prior art level.

Next, the embodiments (I) and (II) of the invention will be explained further concretely with reference to Examples 1 to 4 (Embodiment I) and 5 to 9 (Embodiment II). However, the invention is in no way limited to these Examples. Incidentally, the mean particle size described in each Example can be measured by use of a laser system particle meter

EXAMPLE 1

Figure 5:
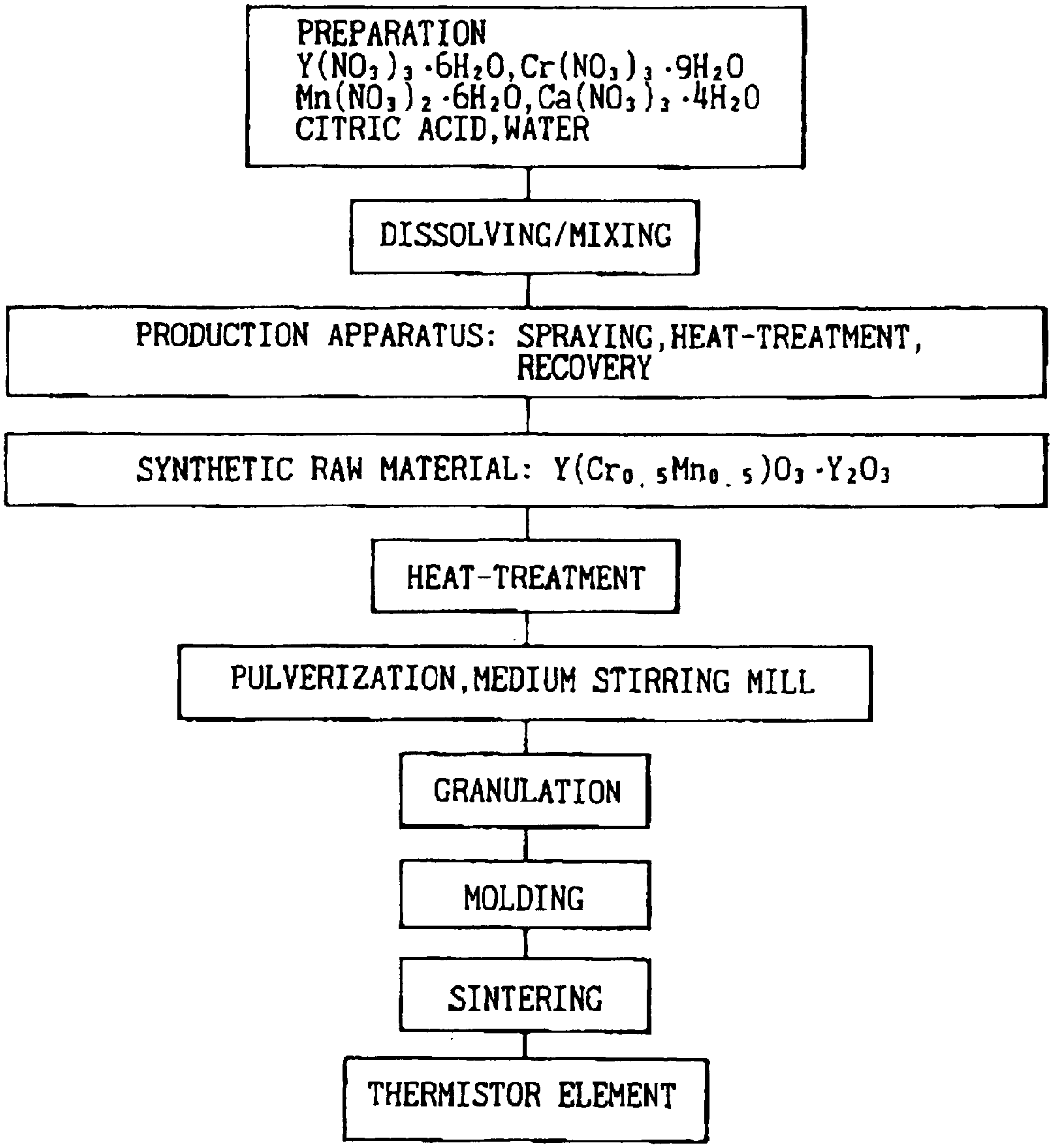
FIG. 5 is a flowchart showing a production process of the thermistor element of Embodiment 1.

This example produces a mixed sintered body $38Y(Cr_{0.5}Mn_{0.5})O_3 \cdot 62Y_2O_3$ using $Y(Cr_{0.5}Mn_{0.5})O_3$ for $(M1M2)O_3$ and $Y_2O_3$ for AOx in the mixed sintered body $(M1M2)O_3 \cdot AOx$ described above by the first production method using the precursor solution. FIG. 5 shows a production process of the thermistor element in this Example 1.

First, a precursor solution of $Y(Cr_{0.5}Mn_{0.5})O_3$ and $Y_2O_3$ is prepared as the starting raw materials. Spraying, heat-treatment and recovery steps are carried out by use of the production apparatus shown in FIG. 3 to obtain $38Y(Cr_{0.5}Mn_{0.5})O_3 \cdot 62Y_2O_3$ as the thermistor raw material powder (synthetic raw material).

In the preparation step, $Y(NO_3)_3 \cdot 6H_2O$, $Mn(NO_3)_2 \cdot 6H_2O$ and $Cr(NO_3)_3 \cdot 9H_2O$ each being an inorganic metal compound and a nitrate having a purity of 99.9% or more are prepared as the staring materials.

These starting materials $Y(NO_3)_3 \cdot 6H_2O$, $Mn(NO_3)_2 \cdot 6H_2O$ and $Cr(NO_3)_3 \cdot 9H_2O$ are weighed so that the composition of the thermistor element finally attains $38Y(Cr_{0.5}Mn_{0.5})O_3 \cdot 62Y_2O_3$.

Further, $Ca(NO_3)_3.4H_2O$ as an inorganic metal compound is added as a Ca raw material of a sintering aid component to 4.5 wt % relative to $38Y(Cr_{0.5}Mn_{0.5})O_3 \cdot 62Y_2O_3$.

Next, citric acid is dissolved with pure water to obtain a citric acid solution with a citric acid concentration of b/a=4-times equivalent where a is a molar number of citric acid and b is a value obtained by converting the total mount of each of Y, Cr and Mn of the thermistor element composition to the molar number.

Subsequently, each of the starting materials weighed as described above and $Ca(NO_3)_3 \cdot 4H_2O$ are added to the citric acid solution. Each element ion (Y, Cr, Mn, Ca) is allowed to react with citric acid to obtain a precursor solution in which the metal ion is dissolved as a complex. The thermistor raw material powder is produced from the precursor solution of $38Y(Cr_{0.5}Mn_{0.5})O_3 \cdot 62Y_2O_3$ by use of the production apparatus shown in FIG. 3.

This example uses an air-atomizing nozzle, a product of Spraying Systems Inc., as a two-fluid nozzle 41 of the atomizing means 4 and forms droplet particles having a mean particle size of 5 to 10 μm. Air is used as a carrier gas of the two-fluid nozzle 41 and its pressure is about 4 $kg/cm^2$. An atomization tank 42 is kept at a negative pressure of 50 to 70 mmaq through a blower directly coupled with the recovering means 6.

The precursor solution of this example is sprayed to the atomization tanks 42 from the nozzle 41, and the droplet particles are introduced into a quartz hollow tube 52 as the heating means 5. Here, the droplet particles inside an electric furnace 51 are heat-treated at a flow velocity of 0.5 m/sec. The temperature in the electric furnace 51 is controlled in four temperature zones (see FIG. 3). The first zone 51*a* from the upstream side is controlled to 200° C., the second zone 51*b*, to 400° C., the third zone 51*c*, to 600° C. and the fourth zone 51*d*, to 900° C., respectively.

The droplet particles thermally reacted and decomposed inside the electric furnace 51 are converted to the thermistor raw material powder as the synthetic raw material having a particle composition that is the same as $38Y(Cr_{0.5}Mn_{0.5})O_3 \cdot 62Y_2O_3$. The recovering means 6 recovers this raw material powder.

In the recovering means 6, the thermistor raw material is stored in recovering jars 62 of two cyclones 61. A filter 63 recovers ultra-fine powder that cannot be collected by the cyclones 61. The filter 63 is a cartridge type filter (VC-20R, a product of Nippon Bileen K. K.) made of a heat-resistant aramid fiber and a Teflon film and having heat-resistance of 200° C.

The cyclones 61 can recover almost all the raw material powder (synthetic raw material) and the filter 63 can recover about 0.3% of the synthetic raw material. When this filter 63 is used in combination, 99.999% of the raw material powder synthesized can be recovered. The filter 63 can also prevent diffusion of the thermistor raw material powder into the open air.

To stabilize the crystal and to remove a trace amount of residual carbon, the resulting thermistor raw material powder (synthetic raw material) is put into a 99.7% alumina crucible and is heat-treated at 800 to 1,200° C.

Next, to make the particle size of the raw material uniform, the thermistor raw material powder is pulverized by use of a medium stirring mill. This example uses a pearl mill device (RV1V, a product of Ashizawa K. K., effective capacity: 1.0 liter, actual capacity: 0.5 liter) as the medium stirring mill. This pearl mill device uses zirconia balls having a diameter of 0.5 mm as a pulverization medium, and 82% of the volume of the stirring tank is filled with the zirconia balls. The pulverizing operation is conducted at a peripheral speed of 12 m/sec and a number of revolutions of 4,000 rpm.

To suppress mutual aggregation of the raw material particles, a dispersant is added to the raw material powder and pulverization is carried out for 2 hours. In this pulverization, a binder, a mold release agent, etc, are also added and are simultaneously pulverized. The thermistor raw material slurry obtained after pulverization has a mean particle size of 0.2 μm.

Next, this thermistor raw material slurry is dried by use of a dryer and is granulated to give granulated powder of $38Y(Cr_{0.5}Mn_{0.5})O_3 \cdot 62Y_2O_3$. The thermistor element 1 having the same shape as the one shown in FIG. 1 is produced by use of this granulated powder.

Molding is conducted in accordance with a metal molding method. Lead wires 11 and 12 have an outer diameter ϕ of 0.3 mm and a length of 5 mm and are made of pure platinum (Pt100). Molding is conducted by use of the metal mold which has an outer diameter ϕ of 1.89 mm and into which the lead wires are inserted at a pressure of about 1,000 kgf/cm$^2$. In this way, a molding of the thermistor element into which the lead wires 11 and 12 are buried and which has an outer diameter ϕ of 1.9 mm can be obtained.

The moldings of the thermistor element are aligned on a setter made of $Al_2O_3$, and are sintered in open air at 1,550° C. for 4 hours to give thermistor elements 1 made of the mixed sintered body $38Y(Cr_{0.5}Mn_{0.5})O_3 \cdot 62Y_2O_3$ and having an outer diameter ϕ of 1.6 mm. Each thermistor element 1 is assembled into a temperature sensor assembly shown in FIG. 2 to give a temperature sensor S.

Temperature accuracy is evaluated for 100 temperature sensors S in this example 1. As a result, temperature accuracy of ±5° C. can be obtained at temperature accuracy ±A° C. described above. Because the example synthesizes the thermistor raw material powder in the uniform composition as the droplet particles, variance of resistance is small and a high-precision temperature sensor can be provided.

EXAMPLE 2

Figure 6:
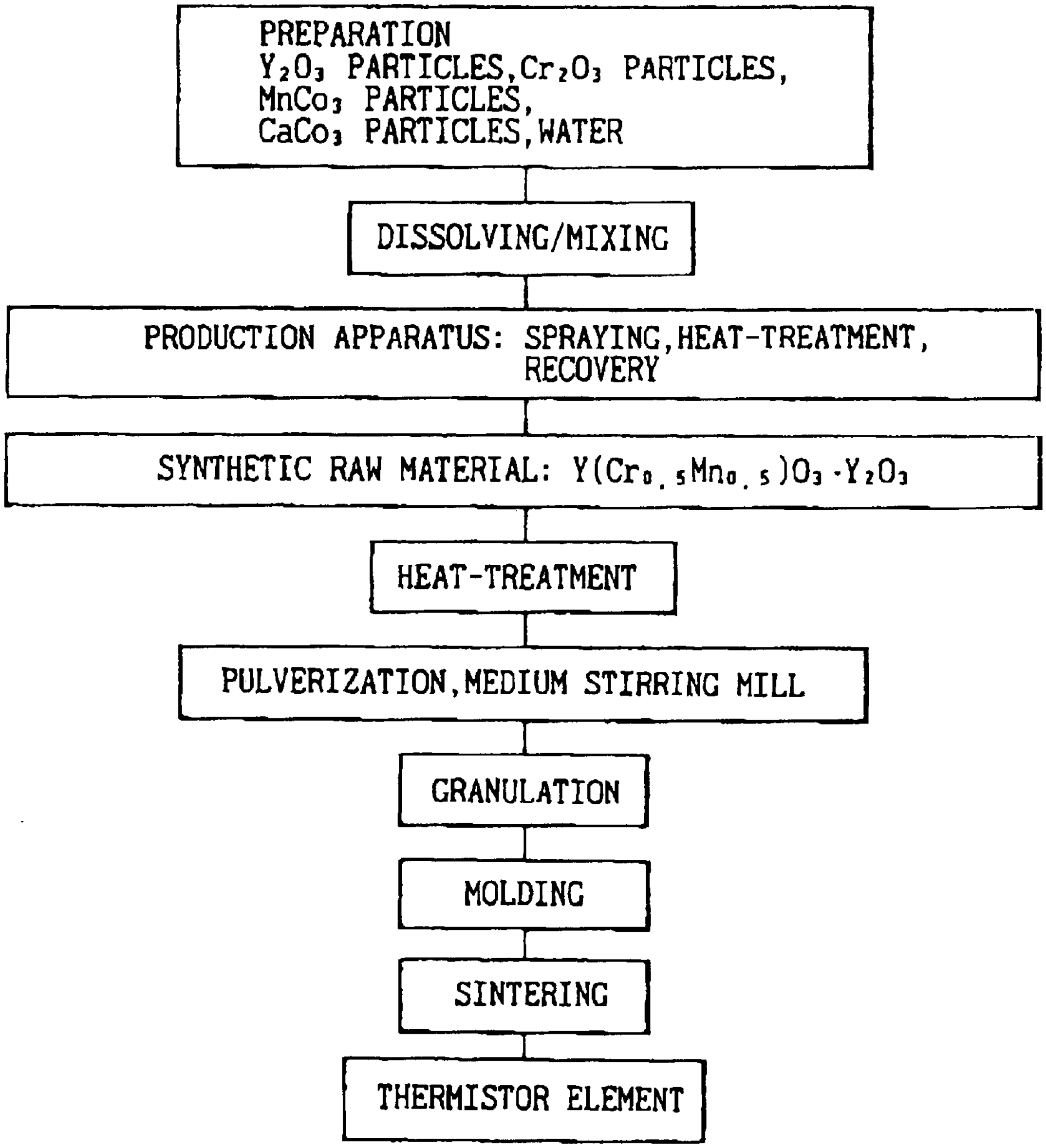
FIG. 6 is a flowchart showing a production process of the thermistor element of Embodiment 2.

In this example 2, the mixed sintered body $38Y(Cr_{0.5}Mn_{0.5})O_3 \cdot 62Y_2O_3$ is produced in accordance with the second production method using the slurry solution described already. FIG. 6 shows a production process of the thermistor element in this example 2.

First, $Y_2O_3$ particles, $Cr_2O_3$ particles, $MnCO_3$ particles and $CaCO_3$ particles are dispersed in water to prepare a slurry solution as the starting materials. The slurry solution is then passed through spraying, heat-treating and recovering steps by use of the production apparatus shown in FIG. 3 to obtain $38Y(Cr_{0.5}Mn_{0.5})O_3 \cdot 62Y_2O_3$ as the thermistor raw material powder (synthetic raw material).

In the first step of preparation, the $Y_2O_3$ particles, the $Cr_2O_3$ particles, the $MnCO_3$ particles and the $CaCO_3$ particles each having a purity of at least 99.9% and being a sol particle having a mean particle size of about 100 nm are prepared as the starting materials.

The $Y_2O_3$ particles, the $Cr_2O_3$ particles and the $MnCO_3$ particles as the starting materials are weighed so that the composition of the final thermitor device attains $38Y(Cr_{0.5}Mn_{0.5})O_3 \cdot 62Y_2O_3$. Further, the $CaCO_3$ particles as the Ca raw material of a sintering aid component are weight to 4.5 wt % on the basis of $38Y(Cr_{0.5}Mn_{0.5})O_3 \cdot 62Y_2O_3$ in the same way as the starting materials described above.

Next, the $Y_2O_3$ particles, the $Cr_2O_3$ particles, the $MnCO_3$ particles and the $CaCO_3$ particles so weighed are dispersed in pure water and a slurry solution is obtained. Thereafter, the slurry solution is passed through the spraying, heat-treating and recovering steps in the same way as in Example 1 to obtain the thermistor raw material powder as the synthetic raw material the particles of which have the same composition as $38Y(Cr_{0.5}Mn_{0.5})O_3 \cdot 62Y_2O_3$. The resulting thermistor raw material powder (synthetic raw material) is heat-treated in the alumina crucible in the same way as in Example 1.

Next, the dispersant, the binder and the mold release agent are added, and pulverization is conducted by use of the medium stirring mill to prepare the thermistor raw material slurry (granulated slurry) having a mean particle size of 0.2 μm in the same way as in Example 1. The slurry solution is passed through drying, granulating, molding and sintering steps in the same way as in Example 1 to give a thermistor element 1 of this example 2.

Temperature accuracy is evaluated for 100 temperature sensors S each incorporating this thermistor element 1 in the same way as in Example 1. As a result, the temperature sensors S of this example 2 can obtain temperature accuracy of ±5° C. Because the thermistor element of this example can be synthesized from the thermistor raw material powder in a uniform composition as the droplet particles, variance of resistance is small and a high-precision temperature sensor can be provided.

EXAMPLE 3

Figure 7:
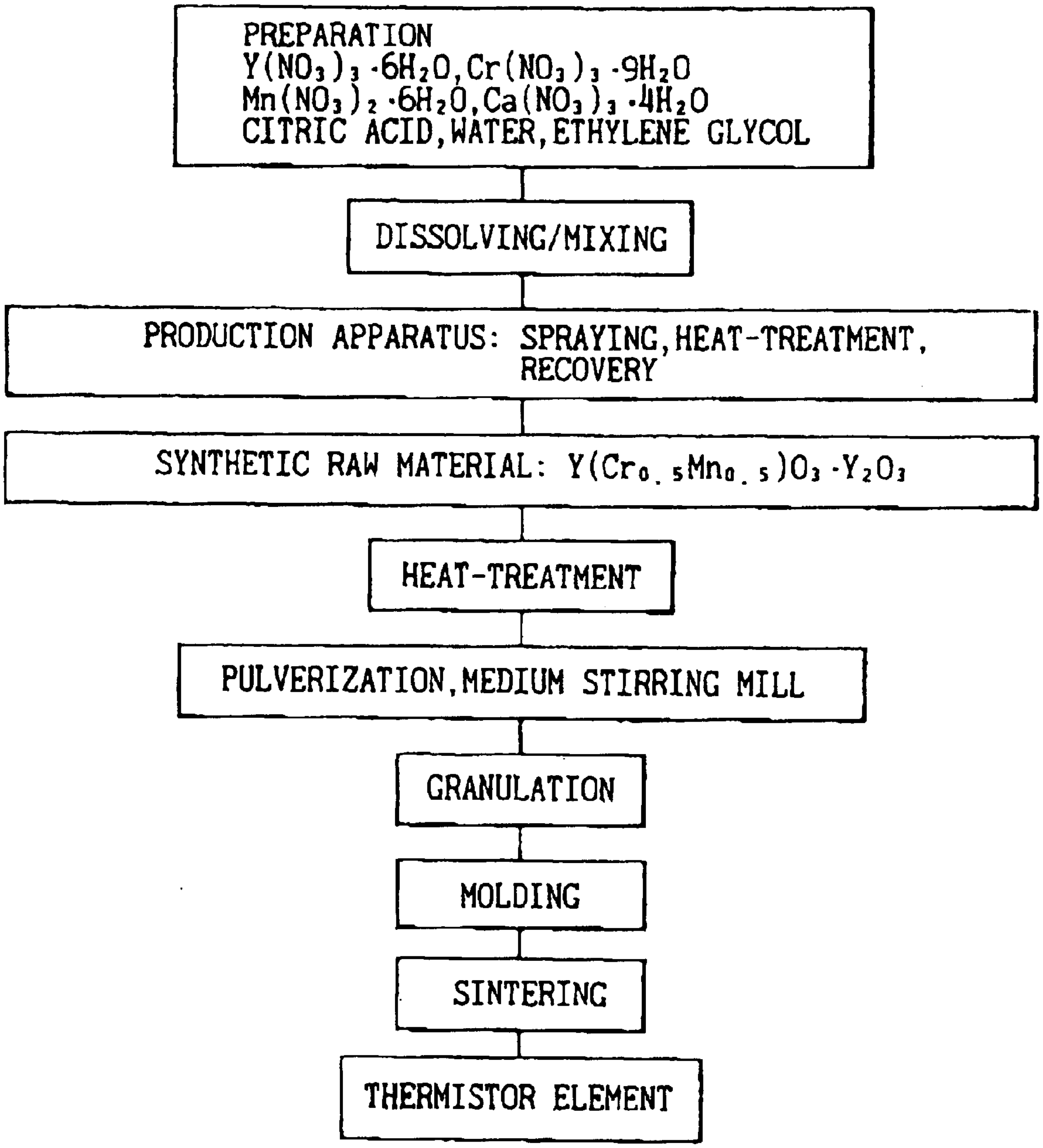
FIG. 7 is a flowchart showing a production process of the thermistor element of Embodiment 3.

In this example 3, the mixed sintered body $38Y(Cr_{0.5}Mn_{0.5})O_3 \cdot 62Y_2O_3$ is produced in accordance with the third production method using the slurry solution described already. FIG. 7 shows a production process of the thermistor element in this example 3.

The precursor solution of $38Y(Cr_{0.5}Mn_{0.5})O_3 \cdot 62Y_2O_3$ is prepared in the same way as in Example 1, and 10% of an ethylene glycol solution (a product of Wako Junyaku K. K.; purity 99.9%) is added as an inflammable solvent to the precursor solution.

The precursor solution to which ethylene glycol is added is used as the precursor solution of this example and is then passed through spraying, heat-treating and recovering steps by use of the production apparatus shown in FIG. 3 to obtain $38Y(Cr_{0.5}Mn_{0.5})O_3 \cdot 62Y_2O_3$ as the thermistor raw material powder (synthetic raw material) in the same way as in Example 1.

The thermistor raw material powder (synthetic raw material) is passed through the heat-treating, pulverizing, drying, granulating, molding and sintering steps in the same way as in Example 1 to give a thermistor element 1. Each thermistor element 1 is assembled to produce a temperature sensor S and temperature accuracy is measured in the same way as in Example 1.

As a result, the temperature sensors according to Example 3 have temperature accuracy of ±4.5° C., and accuracy can be improved in comparison with Examples 1 and 2. It is believed that the addition of the inflammable solvent improves the thermal reaction/decomposition rate during thermal decomposition, thereby improving the uniformity of the composition.

Because the thermistor element can be synthesized from the uniform composition of the thermistor raw material as the droplet particles, this example 3, too, can provide a high-precision temperature sensor having small resistance variance.

EXAMPLE 4

This example 4 produces the mixed sintered body $38Y(Cr_{0.5}Mn_{0.5})O_3 \cdot 62Y_2O_3$ by using the precursor solution in the same way as in Example 1. However, this example employs the fourth production method using the production apparatus including the droplet detecting means 7 and the arithmetic operation/controlling means 8 shown in FIG. 4.

First, the preparation step is conducted in the same way as in Example to obtain the precursor solution of $38Y(Cr_{0.5}Mn_{0.5})O_3 \cdot 62Y_2O_3$. This precursor solution is used to obtain the thermistor raw material powder by use of the production apparatus shown in FIG. 4.

Referring to FIG. 4, the atomizing means 4 supplies the precursor solution from the raw material tank 43 at a rate of 3 liters/hour and air as a carrier gas at a rate of 40 liters/min at an air pressure of about 4 $kg/cm^2$ to the two-fluid nozzle 41 so that the droplet particles are formed in the atomization tank 42. The atomization tank 42 is kept at a negative pressure of 50 to 70 $mmH_2O$ through the blower directly coupled with the recovering means 6 of the subsequent stage.

The droplet particles are introduced into the electric furnace 51, as the heating means 5, through an evaluation cell as the droplet diameter detecting means 7. The droplet diameter detecting means 7 uses a laser diffraction system particle size analyzer (a product of Malburn Co., Mastersyzer 2000) that is integral with the evaluation cell to measure the diameters of the droplet particles. The diameter of the droplet particles has a constant value of 8 $\mu$m on an average during the continuous operation on this example.

At this time, the arithmetic operation/controlling means 8 controls the flow rate of the raw materials, the flow rate of air, the pressure and the set temperature of each temperature zone 51*a* to 51*d* of the electric furnace 51 as the heat-treating means, and can keep the droplet particle diameter at a constant value.

Next, the droplet particles introduced into the electric furnace 51 are allowed to pass through the electric furnace 51 (hollow tube 52) at a flow velocity of 0.5 m/sec and are heat-treated. Thereafter, the spraying, heat-treating and recovering steps are carried out in the same way as in Example 1 to obtain $38Y(Cr_{0.5}Mn_{0.5})O_3 \cdot 62Y_2O_3$ as the thermistor raw material powder (synthetic raw material).

The thermistor element 1 is produced from the resulting thermistor raw material powder (synthetic raw material) through the heat-treating step, the pulverizing step, the drying step, the granulating step, the molding step and the sintering step in the same way as in Example 1. The thermistor element 1 so obtained is assembled into a temperature sensor S, and temperature accuracy of the temperature sensor S is measured in the same way as in Example 1.

As a result, the temperature sensor according to Example 4 provides temperature accuracy of ±3.5° C., and accuracy is improved in comparison with Examples 1 to 3 presumably for the following reason. Namely, because the diameter of the droplet particles is controlled to a predetermined value, the diameter of the resulting raw material powder can be kept constant, too, and the occurrence of the pores during sintering can be reduced. Therefore, the thermistor element having a more uniform composition can be obtained.

Because the thermistor element can be synthesized from the uniform composition of the thermistor raw material as droplet particles, this example 4, too, can provide a high-precision temperature sensor having small resistance variance.

As described above, to reduce variance of the composition of the thermistor raw material, Embodiment I of the invention contemplates to make uniform the composition by reducing the particle size of the thermistor raw materials, forms the droplet particles by spraying the precursor solution prepared by uniformly mixing and dispersing the raw material components in the liquid phase, or the slurry solution dispersing the particles of the metals or metal oxides in the raw material preparation stage, and heat-treats the droplet particles by a heating means (heat-treating means). In this way, Embodiment I can obtain the raw materials having micro-particles and a uniform composition.

Since Embodiment I can thus provide the thermistor element having a more uniform composition and smaller variance of the resistance value than in the prior art through the synthesis of the raw materials as described above, it can provide a temperature sensor having a higher precision performance.

EXAMPLE 5

Figure 8:
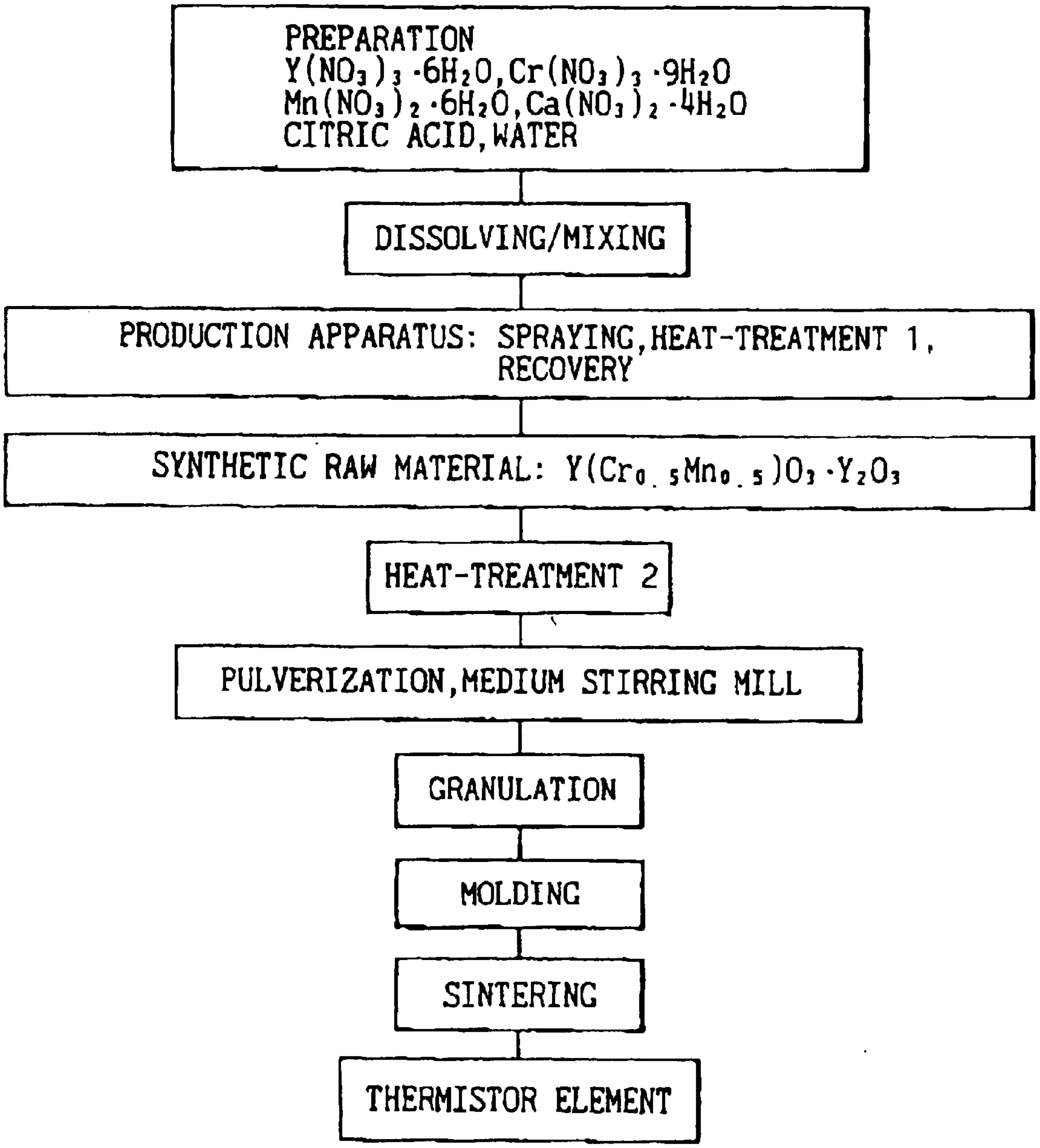
FIG. 8 is a flowchart showing a production process of a ceramic element of Embodiment 5.

This example produces a mixed sintered body $38Y(Cr_{0.5}Mn_{0.5})O_3 \cdot 62Y_2O_3$ using $Y(Cr_{0.5}Mn_{0.5})O_3$ for $(M1M2)O_3$ and $Y_2O_3$ for AOx in the mixed sintered body $(M1M2)O_3 \cdot AOx$ described above by the fifth production method using the precursor solution and the production apparatus shown in FIG. 4. FIG. 8 shows a production process of the ceramic element of this example 5.

First, a precursor solution of $Y(Cr_{0.5}Mn_{0.5})O_3$ and $Y_2O_3$ is prepared as the starting raw materials. Spraying, heat-treating and recovering steps are carried out by use of the production apparatus shown in FIG. 3 to obtain $38Y(Cr_{0.5}Mn_{0.5})O_3 \cdot 62Y_2O_3$ as the ceramic raw material powder (synthetic raw material).

In the preparation step, $Y(NO_3)_3 \cdot 6H_2O$, $Mn(NO_3)_2 \cdot 6H_2O$ and $Cr(NO_3)_3 \cdot 9H_2O$ each being an inorganic metal compound and a nitrate having a purity of 99.9% or more are prepared as the staring materials.

These starting materials $Y(NO_3)_3 \cdot 6H_2O$, $Mn(NO_3)_2 \cdot 6H_2O$ and $Cr(NO_3)_3 \cdot 9H_2O$ are weighed so that the composition of the thermistor element finally attains $38Y(Cr_{0.5}Mn_{0.5})O_3 \cdot 62Y_2O_3$.

Further, $Ca(NO_3)_2 \cdot 4H_2O$ as an inorganic metal compound is weighed as a Ca raw material of a sintering aid component to 4.5 wt % relative to $38Y(Cr_{0.5}Mn_{0.5})O_3.62Y_2O_3$ in the same way as the starting materials described above.

Next, citric acid is dissolved in pure water to obtain a citric acid solution in a citric acid concentration of b/a=4-times equivalent where a is a molar number of citric acid and b is a value obtained by converting the total amount of each of Y, Cr and Mn of the thermistor element composition to the molar number.

Subsequently, each of the starting materials weighed as described above and $Ca(NO_3)_3 \cdot 4H_2O$ are added to the citric acid solution. Each element ion (Y, Cr, Mn, Ca) and citric acid are allowed to react with each other to obtain a precursor solution in which each metal ion is dissolved as a complex (dissolving-mixing step). The thermistor raw material powder is produced from the precursor solution of $38Y(Cr_{0.5}Mn_{0.5})O_3 \cdot 62Y_2O_3$ by use of the production apparatus shown in FIG. 3.

This example uses an air atomizing nozzle, a product of Spraying Systems Inc., as a two-fluid nozzle 41 of the atomizing means 4 and forms droplet particles having a mean particle size of 5 to 10 $\mu$m. Air is used as a carrier gas of the two-fluid nozzle 41 and its pressure is about 4 kg/cm$^2$. An atomization tank 42 is kept at a negative pressure of 50 to 70 mmaq through a blower motor directly coupled with the recovering means 6.

The precursor solution is sprayed to the atomization tanks 42 from the nozzle 41, and the droplet particles are introduced into a quartz hollow tube 52 as the heating means 5. Here, the droplet particles inside an electric furnace 51 are heat-treated (heat-treatment 1) at a flow velocity of 0.5 m/sec (first heat-treating step) The electric furnace 51 controls the temperature in four temperature zones (see FIG. 3). The first zone 51*a* from the upstream side is controlled to 200° C., the second zone 51*b*, to 400° C., the third zone 51*c*, to 600° C. and the fourth zone 51*d*, to 900° C., respectively.

The droplet particles thermally reacted and decomposed inside the electric furnace 51 are converted to the thermistor raw material powder as the synthetic raw material having a particle composition that is the same as $38Y(Cr_{0.5}Mn_{0.5})O_3 \cdot 62Y_2O_3$. The recovering means 6 recovers this raw material powder.

In the recovering means 6, the thermistor raw material powder is stored in the recovering jars 62 of two cyclones 61. A filter 63 recovers ultra-fine powder that cannot be collected by the cyclones 61. The filter 63 is a cartridge type filter (VC-20R, a product of Nippon Bileen K. K.) made of a heat-resistant aramid fiber and a Teflon film and having heat-resistance of 200° C.

The cyclones 61 can recover almost all the raw material powder (synthetic raw material) and the filter 63 can recover about 0.3% of the synthetic raw material. When this filter 63 is used in combination, 99.999% of the raw material powder synthesized can be recovered. The filter 63 can also prevent diffusion of the thermistor raw material powder into the open air.

The ceramic raw material powder (synthetic raw material) so recovered is fine particles having a mean particle size of 30 to 50 nm. Next, to obtain a molding free from the pores, heat-treatment (re-heat-treatment; heat-treatment 2) is conducted at a temperature higher than the temperature (temperature of heat-treatment 1) for synthesizing this ceramic raw material powder.

In this way, the grain growth of the fine powder raw material having a mean particle size of 30 to 50 nm is promoted, and the particle size is regulated so that the ceramic raw material powder has a mean particle size of 0.1 to 1.0 $\mu$m.

In this example, therefore, the fine particle raw material powder having a mean particle size of 30 to 50 nm is put into a 99.7% alumina crucible as the heat-treatment 2 and the re-heat-treatment is conducted at 1,000 to 1,400° C. As a result, the mean particle size of the ceramic raw material powder after re-heat-treatment changes to 1.2 $\mu$m.

Next, to make uniform the particle size of the raw material having the mean particle size of 1.2 $\mu$m, the thermistor raw material powder is pulverized by use of a medium stirring mill. This example uses a pearl mill device (RV1V, a product of Ashizawa K. K., effective capacity: 1.0 liter, actual capacity: 0.5 liter) as the medium stirring mill. This pearl mill device uses zirconia balls having a diameter of 0.5 mm as a pulverization medium, and 82% of the volume of the stirring tank is filled with the zirconia balls. The pulverizing operation is conducted at a peripheral speed of 12 m/sec and a number of revolutions of 4,000 rpm.

To suppress mutual aggregation of the raw material particles, a dispersant is added to the raw material powder having the mean particle size of 1.2 $\mu$m, and pulverization is carried out for 2 hours. In this pulverization, 1 wt % of polyvinyl alcohol (PVA) as a binder, a mold release agent, etc, are also added and are simultaneously pulverized. The thermistor raw material slurry obtained after pulverization (granulated slurry) has a mean particle size of 0.6 $\mu$m.

In this example, the step of the heat-treatment 2 and the pulverizing step for obtaining the granulated slurry containing the dispersant and the mold release agent constitute the second heat-treating step. In this granulated slurry, the mean particle size of the raw material powder is 0.1 to 1.0 $\mu$m (0.6 $\mu$m in this Example).

Next, this thermistor raw material slurry (granulated slurry) is dried by use of a dryer and is granulated to give granulated powder of $38Y(Cr_{0.5}Mn_{0.5})O_3 \cdot 62Y_2O_3$. The granulated powder consist of spheres having a mean particle size of 30 to 60 $\mu$m, a bulk specific gravity of 1.0 and a moisture ratio of about 1%. The thermistor element 1 having the same shape as the one shown in FIG. 1 is produced by use of this granulated powder.

Molding is conducted in accordance with a metal molding method. Lead wires 11 and 12 have an outer diameter $\phi$ of 0.3 mm and a length of 5 mm and are made of pure platinum (Pt100). Molding is conducted by use of the metal mold which has an outer diameter $\phi$ of 1.89 mm and into which the lead wires are inserted at a pressure of about 1,000 kgf/cm$^2$. In this way, a molding of the thermistor element into which the lead wires 11 and 12 are buried and which has an outer diameter $\phi$ of 1.9 mm can be obtained. The bulk specific gravity of this molding is about 60%.

The moldings of the thermistor element are aligned on a setter made of $Al_2O_3$, and are sintered in the open air at 1,550° C. for 4 hours to give thermistor element 1 made of the mixed sintered body $38Y(Cr_{0.5}Mn_{0.5})O_3 \cdot 62Y_2O_3$ and having an outer diameter $\phi$ of 1.6 mm. The resulting ceramic element 1 of this example has a relative specific gravity X of 97.5%.

The ceramic element 1 is assembled into the temperature sensor assembly shown in FIGS. 2(*a*) and 2(*b*) to form a temperature sensor S. When temperature accuracy is evaluated for 100 temperature sensors S in this example 5, temperature accuracy of ±5° C. can be obtained at temperature accuracy ±A° C. described above.

This example controls the particle size by conducting the re-heat-treatment for the synthetic raw material (ceramic raw material powder). Therefore, the pores can be eliminated, and a ceramic element 1 having a high relative specific gravity and free from defects in its internal structure can be obtained. Accordingly, variance of the resistance value of the ceramic element 1 can be reduced and a high-precision temperature sensor can be provided.

EXAMPLE 6

Figure 9:
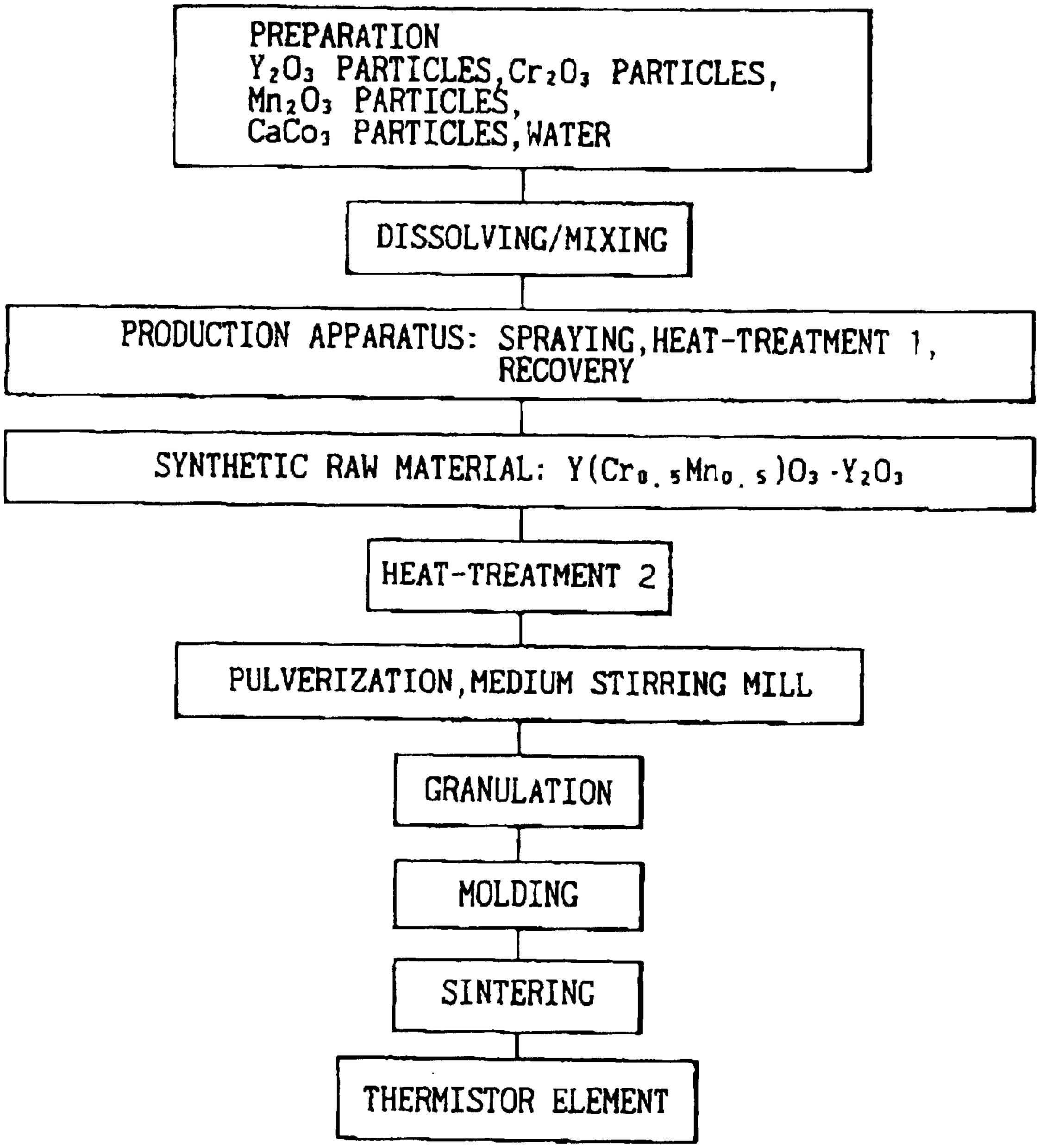
FIG. 9 is a flowchart showing a production process of a ceramic element of Embodiment 6.

In this example 6, the mixed sintered body $38Y(Cr_{0.5}Mn_{0.5})O_3 \cdot 62Y_2O_3$ is produced in accordance with the sixth production method using the slurry solution described already. FIG. 9 shows a production process of the thermistor element in this example 6.

First, $Y_2O_3$ particles, $Cr_2O_3$ particles, $Mn_2CO_3$ particles and $CaCO_3$ particles are dispersed in water to prepare a slurry solution as the starting material. The slurry solution is then passed through spraying, heat-treating and recovering steps by use of the production apparatus shown in FIG. 3 to obtain $38Y(Cr_{0.5}Mn_{0.5})O_3 \cdot 62Y_2O_3$ as the thermistor raw material powder (synthetic raw material).

In the first step of preparation, the $Y_2O_3$ particles, the $Cr_2O_3$ particles, the $Mn_2CO_3$ particles and the $CaCO_3$ particles each having a purity of at least 99.9% and being a sol particle having a mean particle size of about 1 μm are prepared as the starting materials.

The $Y_2O_3$ particles, the $Cr_2O_3$ particles and the $Mn_2CO_3$ particles as the starting materials are weighed so that the composition of the final thermitor device attains $38Y(Cr_{0.5}Mn_{0.5})O_3 \cdot 62Y_2O_3$. Further, the CaCO3 particles as the Ca raw material of a sintering aid component are weight to 4.5 wt % on the basis of $38Y(Cr_{0.5}Mn_{0.5})O_3 \cdot 62Y_2O_3$ in the same way as the starting materials described above.

Next, the $Y_2O_3$ particles, the $Cr_2O_3$ particles, the $MnCO_3$ particles and the $CaCO_3$ particles so weighed are dispersed in pure water and a slurry solution is obtained (stirring/mixing step). Thereafter, the slurry solution is passed through the spraying, heat-treating and recovering step in the same way as in Example 5 to obtain the thermistor raw material powder as the synthetic raw material the particles of which have the same composition as $38Y(Cr_{0.5}Mn_{0.5})O_3 \cdot 62Y_2O_3$.

Re-heat-treatment (heat-treatment 2) is carried out for this ceramic raw material powder (synthetic raw material) in the same way as in Example 5 to obtain ceramic raw material powder (having a mean particle size of 1.2 μm).

Next, the dispersant, the binder (1 wt % of PVA) and the mold release agent are added, and pulverization is conducted by use of the medium stirring mill to prepare the thermistor raw material slurry (granulated slurry) having a mean particle size of 0.2 μm in the same way as in Example 5.

The slurry solution is passed through drying, granulating, molding and sintering steps in the same way as in Example 5 to give a thermistor element 1 of this Example 6. The resulting ceramic element 1 has a relative specific gravity X of 98.5%.

A temperature sensor S incorporating this ceramic element 1 is produced, and temperature accuracy is evaluated in the same way as in Example 5. As a result, the temperature sensors S of this example 6 can provide temperature accuracy of ±5° C.

Because this example can synthesize the thermistor raw material powder in the uniform composition as the droplet particles, and the particle size is controlled by conducting re-heat-treatment of the synthetic raw material (ceramic raw powder), a ceramic element 1 can be obtained that is free from the pores, has a high relative specific gravity and does not have internal defects. Accordingly, variance of resistance of the ceramic element 1 can be reduced and a high-precision temperature sensor S can be provided

EXAMPLE 7

Figure 10:
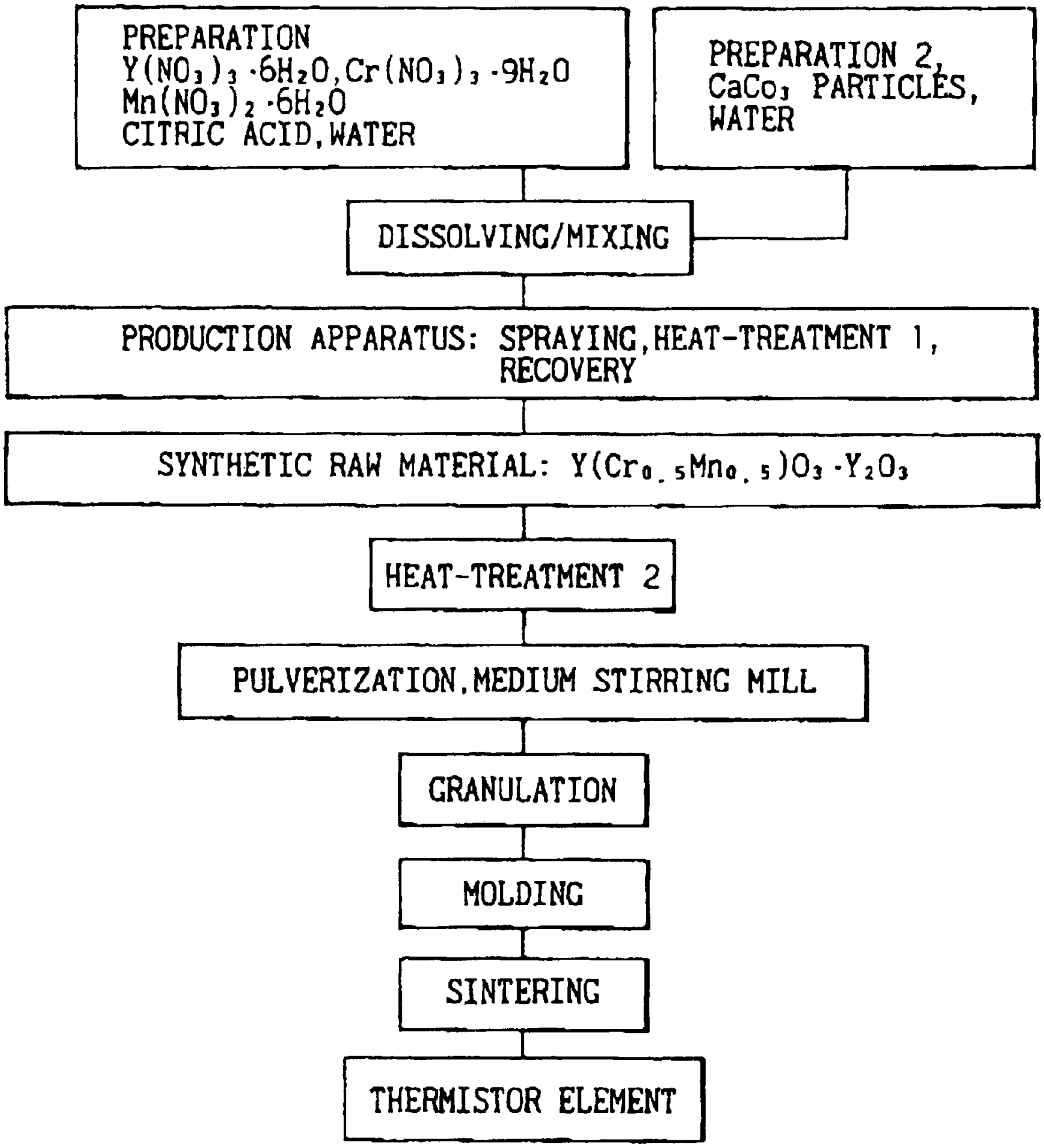
FIG. 10 is a flowchart showing a production process of a ceramic element of Embodiment 7.

This example produces a mixed sintered body $38Y(Cr_{0.5}Mn_{0.5})O_3 \cdot 62Y_2O_3$ by the eighth production method using the dispersion solution described above. FIG. 10 shows a production process of the ceramic element of this example 7.

First, a precursor solution of $Y(Cr_{0.5}Mn_{0.5})O_3$ is prepared (preparation 1), and a slurry solution is prepared by dispersing $CaCO_3$ particles having a mean particle diameter of not greater than 1.0 μm in water (preparation 2).

In the step of preparation 1, $Y(NO_3)_3 \cdot 6H_2O$, $Mn(NO_3)_2 \cdot 6H_2O$ and $Cr(NO_3)_3 \cdot H_2O$ each being an inorganic metal compound and a nitrate having a purity of 99.9% or more are prepared as the staring materials. These starting materials $Y(NO_3)_3 \cdot 6H_2O$, $Mn(NO_3)_2 \cdot 6H_2O$ and $Cr(NO_3)_3 \cdot H_2O$ are weighed so that the composition of the thermistor element finally attains $38Y(Cr_{0.5}Mn_{0.5})O_3 \cdot 62Y_2O_3$.

Next, citric acid is dissolved in pure water to obtain a citric acid solution in a citric acid concentration of b/a=4-times equivalent where a is a molar number of citric acid and b is a value obtained by converting the total mount of each of Y, Cr and Mn of the thermistor element composition to the molar number.

Subsequently, $Y(NO_3)_3 \cdot 6H_2O$, $Mn(NO_3)_2 \cdot 6H_2O$ and $Cr(NO_3)_3 \cdot 9H_2O$ weighed as described above are added to the citric acid solution. Each element ion (Y, Cr, Mn) and citric acid are allowed to react with each other to obtain a precursor solution in which each metal ion is dissolved as a complex.

Next, in the preparation step 2, $CaCO_3$ particles as sol particles having a purity of at least 99.9% and a mean particle size of not greater than 0.1 μm are prepared. As the Ca material of the sintering aid, the $CaCO_3$ particles are weighed to 4.5 wt % to $38Y(Cr_{0.5}Mn_{0.5})O_3 \cdot 62Y_2O_3$, and are dispersed and mixed in pure water. In this way is obtained a slurry solution in which the $CaCO_3$ particles are dispersed.

In the dissolving/mixing step, the precursor solution and the slurry solution are uniformly mixed. The atomizing and heat-treating (heat-treatment 1) steps are carried out by using this mixed solution, that is, the dispersion, in the same way as in Example 1 to obtain ceramic raw material powder as the synthetic raw material whose particles have the same composition as $38Y(Cr_{0.5}Mn_{0.5})O_3 \cdot 62Y_2O_3$.

The re-heat-treating step (heat-treatment 2) is carried out for this ceramic raw material powder (synthetic raw material) in the same way as in Example 1 to obtain the ceramic raw material powder having grown particles. A dispersant, a binder (1 wt % of PVA) and a mold release agent are added to this raw material powder, and pulverization is conducted by use of a medium stirring mill. In this way, ceramic raw material slurry (granulated slurry) containing the raw material powder having a mean particle size of 0.6 μm is prepared in the same way as in Example 1.

The ceramic element 1 of this example 7 is obtained through drying, granulating, molding and sintering steps in the same way as in Example 5. The resulting ceramic element 1 has a relative specific gravity X of 98.0%.

A temperature sensor S incorporating this ceramic element 1 is produced, and temperature accuracy is evaluated in the same way as in Example 5. As a result, the temperature sensors S of this example 7 can provide a temperature accuracy of ±5° C.

As described above, this example can synthesize the thermistor raw material powder in the uniform composition as the droplet particles by the liquid phase method and controls the particle size by conducting re-heat-treatment of the synthetic raw material (ceramic raw powder). Therefore, a ceramic element 1 can be obtained that is free from the pores, has a high relative specific gravity and does not have internal defects. Accordingly, variance of resistance of the ceramic element 1 can be reduced and a high-precision temperature sensor S can be provided.

EXAMPLE 8

In this example 8, the mixed sintered body $38Y(Cr_{0.5}Mn_{0.5})O_3 \cdot 62Y_2O_3$ is produced in accordance with the fifth production method using the precursor solution described already, but is different in the following points.

(1) The heat-treatment (re-heat-treatment) after obtaining the synthetic raw material (ceramic raw material powder) is heat-treatment at 800 to 900° C. for decarbonization. The fine particle state of the synthetic raw material is kept as such, but particle size control by particle growth (control of mean particle size) is not executed.

(2) To obtain a molding free from pores and to make the granulated powder more easily ruptured during molding, polyvinyl alcohol (PVA, degree of polymerization: 600, degree of saponification: 96%) used as the binder for granulation in Example 1 is replaced by polyvinyl acetate alcohol having a lower degree of polymerization (degree of polymerization: 200, degree of saponification 65%).

Figure 11:
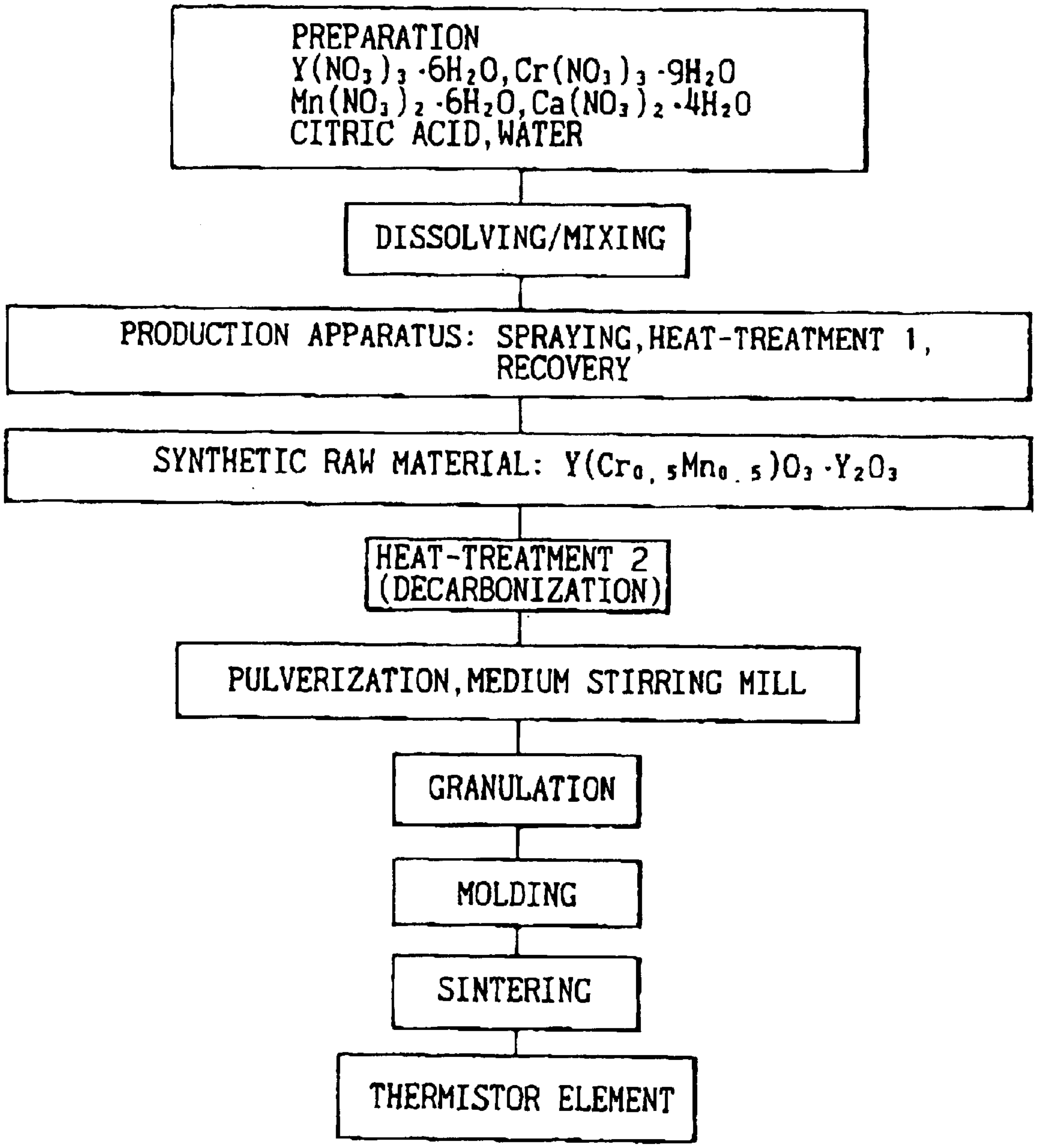
FIG. 11 is a flowchart showing a production process of a ceramic element of Embodiment 9.

FIG. 11 shows a production process of a ceramic element of this example 8. A precursor solution of $38Y(Cr_{0.5}Mn_{0.5})O_3 \cdot 62Y_2O_3$ and $Y_2O_3$ is prepared as the staring raw material in the preparation, dissolving/mixing steps in the same way as in Example 5. The precursor solution is passed through spraying, heat-treating (heat-treatment 1) and recovering steps by use of the production apparatus shown in FIG. 3 to obtain $38Y(Cr_{0.5}Mn_{0.5})O_3 \cdot 62Y_2O_3$ as the ceramic raw material powder (synthetic raw material).

Next, residual carbon is removed from the resulting ceramic raw material powder. Since this residual carbon impedes permeation of the binder into the gaps among the raw material particles in subsequent steps, the residual carbon is preferably removed. Therefore, the ceramic raw material powder is put into a 99.7% alumina crucible and is heat-treated (heat-treatment 2: decarbonization) at 800 to 900° C. The raw material powder after this heat-treatment consists of fine particles having a mean particle size of 80 nm.

Next, a dispersant, a binder and a mold release agent are added, and mixing and pulverization is carried out by use of a medium stirring mill in the same way as in Example 5. In this case, polyvinyl acetate alcohol (SMR, a product of Sinetsu Kagaku K. K.) having a degree of polymerization of 200 and a degree of saponification of 65% is used to prepare granulated slurry.

This granulated slurry is then passed through drying, granulating, molding and sintering steps in the same way as in Example 5 to give a ceramic element 1 of this example 8. The resulting ceramic element 1 has a relative specific gravity X of 97.5%.

A temperature sensor S incorporating this ceramic element 1 is produced, and temperature accuracy is evaluated in the same way as in Example 5. As a result, the temperature sensors S of this example 8 can provide a temperature accuracy of ±5° C.

As described above, this example can synthesize the thermistor raw material powder in the uniform composition as the droplet particles, and uses the organic binder having a degree of polymerization of not higher than 2,000 and a degree of saponification of at least 45% as the binder to be added. Therefore, this example can provide a ceramic element 1 that is free from the pores, has a high relative specific gravity and does not have internal defects. Accordingly, variance of resistance of the ceramic element 1 can be reduced and a high-precision temperature sensor S can be provided.

EXAMPLE 9

In this example 9, the mixed sintered body $38Y(Cr_{0.5}Mn_{0.5})O_3 \cdot 62Y_2O_3$ is produced in accordance with the fifth production method using the precursor solution, but is different from Example 8 in that polyacetal is used as the binder for granulation in place of polyvinyl acetate alcohol used in Example 8. The rest of the construction is the same as those of Example 8.

The steps of preparation, dissolving/mixing, spraying, heat-treatment 1, recovery and heat-treatment 2 (decarbonization) are carried out in the same way as in Example 8. Thereafter, a dispersant, a binder and a mold release agent are added to the ceramic raw material powder (synthetic raw material) and mixing/pulverization is conducted by use of a medium stirring mill. Polyacetal (a product of Sekisui Kagaku K. K.) having a degree of polymerization of 1,000 and a degree of saponification of 70% is used at this time as the binder to prepare granulated slurry.

This granulated slurry is passed through drying, granulating, molding and sintering steps in the same way as in example 5 to obtain the same ceramic element 1 as that of Example 8. The resulting ceramic element 1 has a relative specific gravity X of 97.3%.

A temperature sensor S incorporating this ceramic element 1 is produced, and the temperature accuracy is evaluated in the same way as in Example 5. As a result, the temperature sensors S of this example 9 can provide a temperature accuracy of ±5° C.

As described above, this example can synthesize the thermistor raw material powder in the uniform composition as the droplet particles by the liquid phase method, and uses the organic binder having a degree of polymerization of not higher than 2,000 and a degree of saponification of at least 45% as the binder to be added. Therefore, this example can provide a ceramic element 1 that is free from the pores in the molding, has a high relative specific gravity and does not have internal defects. Accordingly, variance of resistance of the ceramic element 1 can be reduced and a high-precision temperature sensor S can be provided.

What is claimed is:

1. A method of producing a thermistor element consisting of a metal oxide sintered body as a principal component thereof, comprising the steps of:

mixing a precursor of said metal oxide in a liquid phase thereby preparing a precursor solution;

spraying said precursor solution thereby obtaining droplet particles;

heat-treating said droplet particles thereby obtaining thermistor raw material powder; and molding and sintering said thermistor raw material powder into a desired shape, thereby obtaining said metal oxide sintered body.

2. A method of producing a thermistor element as defined in claim 1, wherein said precursor solution is a solution containing at least one kind of metal ion complex.

3. A method of producing a thermistor element as defined in claim 1, wherein a solvent of said precursor solution is water and/or an organic solvent.

4. A method of producing a thermistor element as defined in claim 1, wherein a precursor solution containing an inflammable solvent is added and mixed thereto as said precursor solution.

5. A method of producing a thermistor element as defined in claim 4, wherein said inflammable solvent is a member selected from the group consisting of methanol, ethanol, isopropyl alcohol, ethylene glycol and acetone.

6. A method of producing a thermistor element as defined in claim 1, which uses heating means capable of controlling a temperature so as to progressively increase the temperature from an inlet of said droplet particles towards an outlet in said step of heat-treating said droplet particles, and provides, as said thermistor raw material powder, a powder having sphericalness X of at least 80%, defined by a maximum particle size Rmax and a minimum particle size Rmin of said powder and expressed by the following equation (1):

$$X=(R\min/R\max)\times 100\% \quad (1).$$

7. A method of producing a ceramic element as define in claim 6, wherein a molar fraction a of said compound oxide $(M1M2)O_3$ and a molar fraction b of said metal oxide AOx in said mixed sintered body $(M1M2)O_3\cdot AOx$ satisfy the relation $0.05\leqq a<1.0, 0\leqq b\leqq 0.95$ and a+b=1.

8. A method of producing a thermistor element as defined in claim 1, wherein the particle size of said droplet particles is not greater than 100 $\mu$m.

9. A method of producing a thermistor element as defined in claim 1, wherein said metal oxide sintered body is a mixed sintered body $(M1M2)O_3\cdot AOx$ of a compound oxide expressed by $(M1M2)O_3$ and a metal oxide expressed by AOx, M1 in said compound oxide $(M1M2)O_3$ is at least one kind of elements selected from the Group 2A and the Group 3A of the Periodic Table with the exception of La, M2 is at least one kind of elements selected from the Groups 3D, 4A, 5A, 6A, 7A and 8 of the Periodic Table, and said metal oxide AOx is a metal oxide having a melting point of 1,400° C. or above and a resistance value of at least 1,000 Ω at 1,0000° C. as a single substance of AOx in the form of said thermistor element.

10. A method of producing a thermistor element as defined in claim 9, wherein a molar fraction a of said compound oxide $(M1M2)O_3$ and a molar fraction b of said metal oxide AOx in said mixed sintered body $(M1M2)O_3\cdot AOx$ satisfy the relation $0.05\leqq a<1.0$, $0<b\leqq 0.95$ and a+b=1.

11. A method of producing a thermistor element as defined in claim 9, wherein M1 in said compound oxide $(M1M2)O_3$ is at least one kind of elements selected from the group consisting of Mg, Ca, Sr, Ba, Y, Ce, Pr, Nd, Sm, Eu, Gd, Tb, Dy, Ho, Er, Yb and Sc, and M2 is at least one kind of elements selected from the group consisting of Al, Ga, Ti, Zr, Hf, V, Nb, Ta, Cr, Mo, W, Mn, Tc, Re, Fe, Co, Ni, Ru, Rh, Pd, Os, Ir and Pt.

12. A method of producing a thermistor element as defined in claim 9, wherein the metal A in said metal oxide AOx is at least one kind of element selected from the group consisting of B, Mg, Al, Si, Ca, Sc, Ti, Cr, Mn, Fe, Ni, Zn, Ga, Ge, Sr, Y, Zr, Nb, Sn, Ce, Pr, Nd, Sm, Eu, Gd, Tb, Dy, Ho, Er, Tm, Yb, Lu, Hf, and Ta.

13. A method of producing a thermistor element as defined in claim 9, wherein said metal oxide AOx is at least one kind of metal oxides selected from the group consisting of $B_2O_3$, MgO, $Al_2O_3$, $SiO_2$, $Sc_2O_3$, $TiO_2$, $Cr_2O_3$, MnO, $Mn_2O_3$, $Fe_2O_3$, $Fe_3O_4$, NiO, ZnO, $Ga_2O_3$, $Y_2O_3$, $ZrO_2$, $Nb_2O_5$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_5$, $2MgO\cdot SiO_2$, $MgSiO_3$, $MgCr_2O_4$, $MgAl_2O_4$, $CaSiO_3$, $YAlO_3$, $Y_3Al_5O_{12}$, $Y_2SiO_5$ and $3Al_2O\cdot 2SiO_2$.

14. A method of producing a thermistor element as defined in claim 9, wherein said M1 is Y, said M2 is Cr and Mn and said metal oxide AOx is $Y_2O_3$.

15. A method of producing a thermistor element as defined in claim 9, wherein said mixed sintered body $(M1M2)O_3\cdot AOx$ contains at least one kind of CaO, $CaCO_3$, $SiO_2$ and $CaSiO_3$ as a sintering aid.

16. A method of producing a thermistor element consisting of a metal oxide sintered body as a principal component thereof, comprising the steps of:

preparing a slurry solution by dispersing therein particles of a metal or a metal oxide;

spraying said slurry solution thereby obtaining droplet particles;

heat-treating said droplet particles thereby obtaining thermistor raw material powder; and molding and sintering said thermistor raw material powder into a desired shape, thereby obtaining said metal oxide sintered body.

17. A method of producing a thermistor element as defined in claim 16, wherein the size of the particles of said metal or said metal oxide in said slurry solution are not greater than 100 nm.

18. A method of producing a thermistor element as defined in claim 16, wherein a solvent of said slurry solution is water and/or an organic solvent.

19. A method of producing a thermistor element as defined in claim 16, wherein a slurry solution containing an inflammable solvent is added and mixed thereto as said slurry solution.

20. A method of producing a ceramic element comprising a sintered body obtained by sintering a ceramic raw material made of a metal oxide, comprising:

using as said ceramic raw material a raw material powder produce by a liquid phase method and having a mean particle size of 0.1 to 1.0 $\mu$m, and granulating, molding and sintering said ceramic raw material so that said sintered body has a relative specific gravity X, defined by a sintering specific gravity and a theoretical specific gravity, and expressed by the following equation (2), of at least 90%:

$$\text{relative specific gravity } X=(\text{sintering specific gravity}/\text{theoretical specific gravity})\times 100\% \quad (2).$$

21. A method of producing a ceramic element as defined in claim 20, wherein a moisture ratio of granulated powder obtained after granulating said raw material powder is set to 3% or below.

22. A method of producing a ceramic element defined in claim 20, wherein a bulk specific gravity of a molding obtained after molding said raw material powder is set to at least 50%.

23. A method of producing a ceramic element as defined in claim 20, wherein a granulated slurry is prepared using said raw material powder having a mean particle size of 0.1 to 1.0 $\mu$m, and said ceramic raw material powder is converted to spheres so that the resulting powder has sphericalness Y defined by a maximum particle size Rmax and a minimum particle size Rmin and expressed by the following equation (1), of at least 80%:

$$Y=(R\min/R\max)\times 100\%. \quad (1).$$

24. A method of producing a ceramic element as defined in claim 20, wherein said ceramic element is a thermistor element formed of a mixed sintered body $(M1M2)O_3\cdot AOx$ of a compound oxide expressed by $(M1M2)O_3$ and a metal oxide expressed by AOx, M1 in said compound oxide $(M1M2)O_3$ is at least one kind of element selected from the Group 2A and the Group 3A of the Periodic Table with the exception of La, M2 is at least one kind of element selected from the Groups 3B, 4A, SA, 6A, 7A and 8 of the Periodic Table, and said metal oxide AOx is a metal oxide having a melting point of 1,400° C. or above and a resistance value of at least 1,000 Ω at 1,000° C. as a single substance of AOx in the form of said thermistor element.

25. A method of producing a ceramic element as defined in claim 24, wherein M1 in said compound oxide (M1M2)$O_3$ is at least one kind of elements selected from the group consisting of Mg, Ca, Sr, Ba, Y, Ce, Pr, Nd, Sm, Eu, Gd, Tb, Dy, Ho, Er, Yb and Sc, and M2 is at least one kind of elements selected from the group consisting of Al, Ga, Ti, Zr, Hf, V, Nb, Ta, Cr, Mo, W, Mn, Tc, Re, Fe, Co, Ni, Ru, Rh, Pd, Os, Ir and Pt.

26. A method of producing a ceramic element as define in claim 24, wherein the metal A in said metal oxide AOx is at least one kind of elements selected from the group consisting of B, Mg, Al, Si, Ca, Sc, Ti, Cr, Mn, Fe, Ni, Zn, Ga, Ge, Sr, Y, Zr, Nb, Sn, Ce, Pr, Nd, Sm, Eu, Gd, Tb, Dy, Ho, Er, Tm, Yb, Lu, Hf and Ta.

27. A method of producing a ceramic element as define in claim 24, wherein said metal oxide AOx is at least one kind of metal oxides selected from the group consisting of $B_2O_3$, MgO, $Al_2O_3$, $SiO_2$, $Sc_2O_3$, $TiO_2$, $Cr_2O_3$, MnO, $Mn_2O_3$, $Fe_2O_3$, $Fe_3O_4$, NiO, ZnO, $Ga_2O_3$, $Y_2O_3$, $ZrO_2$, $Nb_2O_5$, $SnO_2$, $CeO_2$, $Pr_2O_3$, $Nd_2O_3$, $Sm_2O_3$, $Eu_2O$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $HfO_2$, $Ta_2O_5$, $2MgO \cdot SiO_2$, $MgSiO_3$, $MgCr_2O_4$, $MgAl_2O_4$, $CaSiO_3$, $YAlO_3$, $Y_3Al_5O_{12}$, $Y_2SiO_5$ and $3Al_2O \cdot 2SiO_2$.

28. A method of producing a ceramic element as define in claim 24, wherein said M1 is Y, said M2 is Cr and Mn and said metal oxide AOx is $Y_2O_3$.

29. A method of producing a ceramic element as defined in claim 24, wherein said mixed sintered body (M1M2)$O_{03} \cdot$AOx contains at least one of CaO, $CaCO_3$, $SiO_2$ and $CaSiO_3$ as a sintering aid.

30. A method of producing a ceramic element formed of a sintered body obtained by sintering a ceramic raw material made of a metal oxide, comprising the steps of:

mixing a precursor of said metal oxide in a liquid phase thereby preparing a precursor solution;

spraying said precursor solution thereby obtaining droplet particles;

conducting a first heat-treatment step of heat-treating said droplet particles thereby obtaining raw material powder of said ceramic element;

conducting a second heat-treatment step of heat-treating said raw material powder obtained by said first heat-treatment step at a temperature higher than that of said first heat-treatment step, thereby changing a mean particle size of said raw material powder to 0.1 to 1.0 $\mu$m; and granulating, molding and sintering said raw material obtained by said second heat-treatment step.

31. A method of producing a ceramic element formed of a sintered body obtained by sintering a ceramic raw material made of a metal oxide, comprising the steps of:

preparing a slurry solution by dispersing therein particles of a metal or a metal oxide having a mean particle size of 1.0 $\mu$m or below;

spraying said slurry solution thereby obtaining droplet particles;

conducting a first-heat-treatment step of heat-treating said droplet particles thereby obtaining raw material powder of said ceramic element;

conducting a second heat-treatment step of heat-treating said raw material powder obtained by said first heat-treatment step at a temperature higher than that of said first heat-treatment step, thereby changing a mean particle size of said raw material powder to 0.1 to 1.0 $\mu$m; and granulating, molding and sintering said raw material obtained by said second heat-treatment step.

32. A method of producing a ceramic element formed of a sintered body obtained by sintering a ceramic raw material made of a metal oxide, comprising the steps of:

mixing a precursor of said metal oxide in a liquid phase thereby preparing a precursor solution;

preparing a dispersion solution by dispersing particles of a metal or a metal oxide having a mean particle size of not greater than 1.0 $\mu$m in said precursor solution;

spraying said dispersion solution thereby obtaining droplet particles;

conducting a first heat-treatment step of heat-treating said droplet articles thereby obtaining a raw material powder of said ceramic element;

conducting a second heat-treatment step of heat-treating said raw material powder obtained by said first heat-treatment step at a temperature higher than that of said first heat-treatment step, thereby changing a mean particle size of said raw material powder to 0.1 to 1.0 $\mu$m; and granulating, molding and sintering said raw material obtained by said second heat-treatment step.

33. A method of producing a ceramic element formed of a sintered body comprising the steps of:

mixing a binder for granulating ceramic raw material powder with a ceramic raw material powder made of a metal oxide and sintering the mixture, wherein said ceramic powder is prepared by a liquid phase method, said binder is an organic binder having a degree of polymerization of 2,000 or below and a degree of saponification of at least 45%, and the mixture of said ceramic raw material powder and said organic binder is granulated, molded and sintered so that said sintered body has a relative specific gravity X, defined by a sintering specific gravity and a theoretical specific gravity and expressed by the following equation (2), of at least 90%:

$$\text{relative specific gravity } X = (\text{sintering specific gravity}/\text{theoretical specific gravity}) \times 100\% \quad (2).$$

34. A method of producing a ceramic element as defined in claim 33, wherein said organic binder is at least one member selected from the group consisting of polyvinyl alcohol, polyacetal and polyvinyl acetate alcohol.

* * * * *

UNITED STATES PATENT AND TRADEMARK OFFICE

CERTIFICATE OF CORRECTION

PATENT NO. : 6,824,713 B2
DATED : November 30, 2004
INVENTOR(S) : Kuzuoka et al.

It is certified that error appears in the above-identified patent and that said Letters Patent is hereby corrected as shown below:

Title page,
Item [54], Title, should read:
-- METHOD OF PRODUCING THERMISTOR ELEMENT AND PRODUCTION APPARATUS FOR PRODUCING RAW MATERIALS FOR THERMISTOR ELEMENT --

Signed and Sealed this

Fifteenth Day of February, 2005

JON W. DUDAS
*Director of the United States Patent and Trademark Office*